United States Patent
Kim et al.

(10) Patent No.: US 11,467,739 B2
(45) Date of Patent: Oct. 11, 2022

(54) STORAGE DEVICE AND OPERATION METHOD THEREOF

(71) Applicant: SAMSUNG ELECTRONICS CO., LTD., Suwon-si (KR)

(72) Inventors: Byoung Geun Kim, Seoul (KR); Keunsan Park, Hwaseong-si (KR); Sangyoon Oh, Suwon-si (KR); Byung-Ki Lee, Hwaseong-si (KR); Yonghwa Lee, Hwaseong-si (KR); Jooyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 17/076,619

(22) Filed: Oct. 21, 2020

(65) Prior Publication Data

US 2021/0216220 A1   Jul. 15, 2021

(30) Foreign Application Priority Data

Jan. 15, 2020   (KR) ................. 10-2020-0005368

(51) Int. Cl.
  *G06F 3/06*   (2006.01)
(52) U.S. Cl.
  CPC .......... *G06F 3/0622* (2013.01); *G06F 3/0604* (2013.01); *G06F 3/0656* (2013.01); *G06F 3/0659* (2013.01); *G06F 3/0679* (2013.01)
(58) Field of Classification Search
  CPC .... G06F 3/0679; G06F 3/0659; G06F 3/0656; G06F 3/0604; G06F 3/0622
  See application file for complete search history.

(56) References Cited

U.S. PATENT DOCUMENTS

| | | |
|---|---|---|
| 9,075,710 B2 | 7/2015 | Talagala et al. |
| 9,135,287 B2 | 9/2015 | Castellano |
| 9,953,107 B2 | 4/2018 | Marukame et al. |
| 10,007,548 B2 | 6/2018 | Sasaki |
| 10,210,168 B2 | 2/2019 | Chiu et al. |
| 10,346,048 B2 | 7/2019 | Devendrappa et al. |

(Continued)

FOREIGN PATENT DOCUMENTS

| | | |
|---|---|---|
| EP | 3 260 971 A1 | 12/2017 |
| EP | 3 279 810 A1 | 2/2018 |

OTHER PUBLICATIONS

SNIA Advancing Storage & Information Technology, "Key Value Storage API Specification" Version 1.0, Apr. 20, 2019, 60 Pages.

*Primary Examiner* — Edward J Dudek, Jr.
(74) *Attorney, Agent, or Firm* — Volentine, Whitt & Francos, PLLC

(57) ABSTRACT

An operation method of a storage device, which includes a nonvolatile memory device, includes receiving a first key-value (KV) command including a first key from an external host device; transmitting a first value corresponding to the first key from the nonvolatile memory device to the external host device as first user data, in response to the first KV command; receiving a second KV command including a second key, from the external host device; and performing a first administrative operation based on a second value corresponding to the second key, in response to the second KV command. The first KV command and the second KV command are KV commands of a same type.

18 Claims, 34 Drawing Sheets

(56) References Cited

U.S. PATENT DOCUMENTS

| | | | |
|---|---|---|---|
| 2013/0275656 A1* | 10/2013 | Talagala | G06F 12/0246 |
| | | | 711/103 |
| 2015/0378606 A1 | 12/2015 | Huang | |
| 2016/0110292 A1 | 4/2016 | Choi et al. | |
| 2018/0210841 A1 | 7/2018 | Yang et al. | |
| 2019/0087130 A1 | 3/2019 | Lee et al. | |
| 2021/0234708 A1* | 7/2021 | Van Antwerpen | G06F 3/0622 |

* cited by examiner

STORAGE DEVICE AND OPERATION METHOD THEREOF

CROSS-REFERENCE TO RELATED APPLICATIONS

This application claims priority under 35 U.S.C. § 119 to Korean Patent Application No. 10-2020-0005368 filed on Jan. 15, 2020, in the Korean Intellectual Property Office, the disclosure of which is incorporated by reference herein in its entirety.

TECHNICAL FIELD

Embodiments of the disclosure described herein relate to a semiconductor memory, and more particularly, relate to a storage device and an operation method thereof.

BACKGROUND

A semiconductor memory device is classified as a volatile memory device, in which stored data disappear when power is turned off, such as a static random access memory (SRAM) or a dynamic random access memory (DRAM), or a nonvolatile memory device, in which stored data are retained even when power is turned off, such as a flash memory device, a phase-change RAM (PRAM), a magnetic RAM (MRAM), a resistive RAM (RRAM), or a ferroelectric RAM (FRAM).

A flash memory based solid state drive (SSD) is widely used as a high-capacity storage medium. In general, the SSD communicates with a host through a given interface. In this case, the host may perform various management operations for obtaining a variety of information from the SSD. To perform the management operations, the host may use various commands defined by the given interface. However, as a variety of information is provided from the SSD, various commands need to be defined by the given interface, thereby making a configuration of the interface complicated.

SUMMARY

Embodiments of the disclosure provide a storage device with improved performance and reduced costs and an operation method thereof.

According to an exemplary embodiment, an operation method of a storage device, which includes a nonvolatile memory device, includes receiving a first key-value (KV) command including a first key from an external host device; transmitting a first value corresponding to the first key from the nonvolatile memory device to the external host device as first user data, in response to the first KV command; receiving a second KV command including a second key, from the external host device; and performing a first administrative (herein abbreviated as "admin") operation based on a second value corresponding to the second key, in response to the second KV command. The first KV command and the second KV command are KV commands of a same type.

According to an exemplary embodiment, a storage device includes a nonvolatile memory device that stores a user key-value pair including a first value corresponding to a user key and a storage controller that controls the nonvolatile memory device. The storage controller includes a memory device that stores an internal key-value pair including a second value corresponding to an internal key and a key index including information about the user key, the internal key, and locations of the first and second values. A key-value (KV) manager determines whether a key included in a first key-value (KV) command from an external host device is the internal key or the user key, based on the key index, in response to the first KV command; transmits the first value to the external host device when the key is the user key; and performs a first admin operation corresponding to the second value when the key is the internal key.

According to an exemplary embodiment, an operation method of a storage device, which includes a nonvolatile memory device, includes receiving a first key-value (KV) command including a first key from an external host device; determining whether the first key is an internal key or a user key; and performing a first admin operation for the storage device when the first key is the internal key.

According to an exemplary embodiment, an operation method of a host, which is configured to control a storage device, includes transmitting a first key-value (KV) command to the storage device; receiving information about an internal KV pair including information about at least one internal key and at least one value from the storage device; transmitting a second KV command including a first internal key among the at least one internal key to the storage device, based on the internal KV pair; receiving first device information corresponding to a first value corresponding to the first internal key from among the at least one value, from the storage device responding to the second KV command; transmitting a third KV command including a first user key to the storage device; and receiving first user data corresponding to the first user key from the storage device responding to the third KV command.

According to an exemplary embodiment, an operation method of a host, which is configured to control a storage device, includes transmitting a first KV command including a first internal key corresponding to a first admin command to the storage device, and performing a first admin operation of the storage device based on the first KV command; transmitting a second KV command including a second internal key corresponding to a second admin command to the storage device, and performing a second admin operation of the storage device based on the second KV command; transmitting a third KV command including a first user key corresponding to first user data to the storage device, and reading the first user data from the storage device based on the third KV command; and transmitting a fourth KV command including a second user key corresponding to second user data and a second value corresponding to the second user data to the storage device, and storing the second user data in the storage device based on the fourth KV command. At least two of the first to fourth KV commands are KV commands of a same type.

According to an exemplary embodiment, an operation method of a storage system, which includes a host device and a storage device, includes transmitting, at the host device, a first key-value (KV) command including a first user key to the storage device; transmitting, at the storage device, a first value corresponding to the first user key to the host device as first user data, in response to the first KV command; transmitting, at the host device, a second KV command including a first internal key to the storage device; and performing, at the storage device, a first admin operation corresponding to a second value corresponding to the first internal key, in response to the second KV command. The first KV command and the second KV command are KV commands of a same type.

BRIEF DESCRIPTION OF THE FIGURES

The above and other objects and features of the disclosure will become apparent by describing in detail exemplary embodiments thereof with reference to the accompanying drawings.

DETAILED DESCRIPTION

Below, embodiments of the disclosure may be described in detail and clearly to such an extent that an ordinary one in the art easily implements the disclosure.

Figure 1:
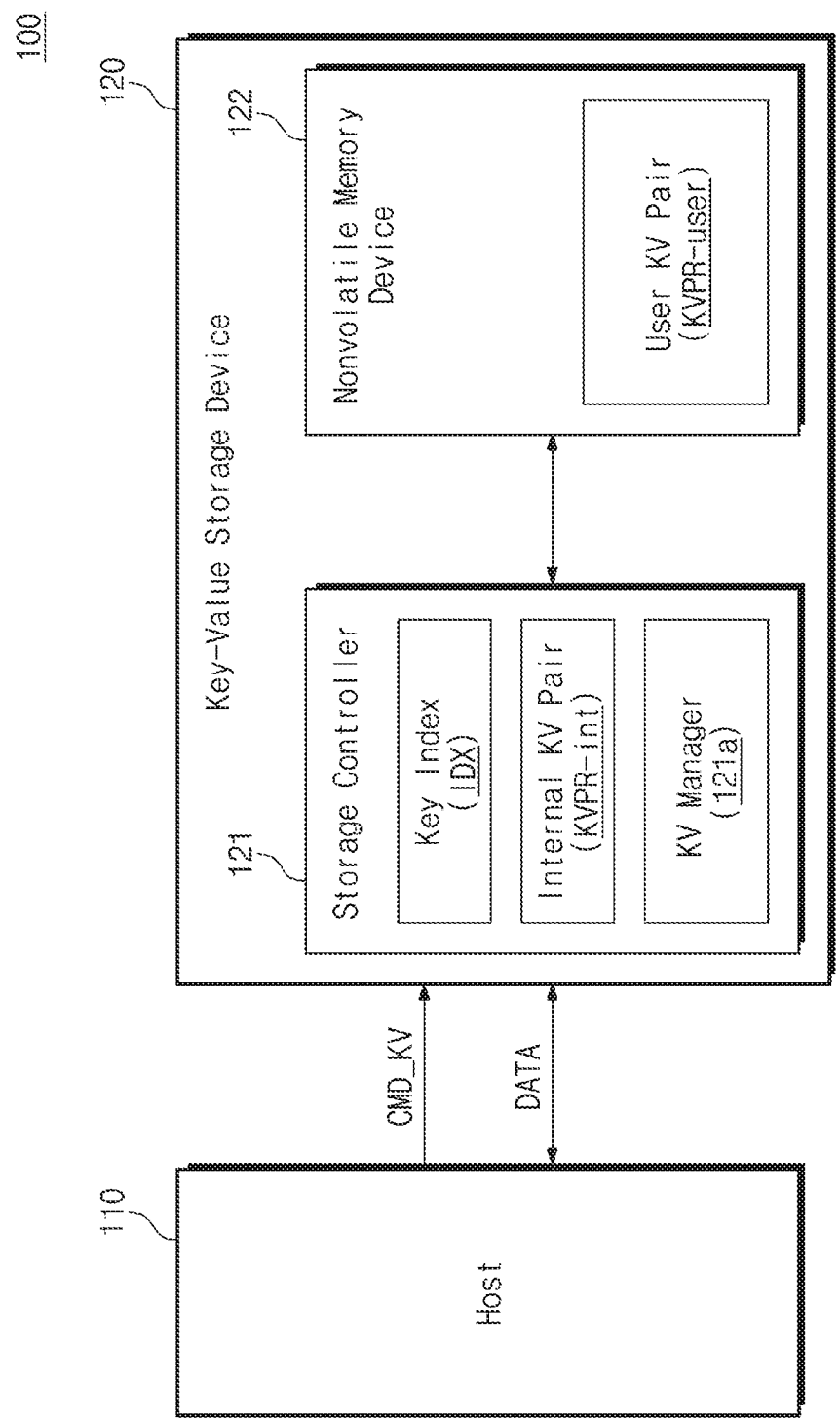
FIG. 1 is a block diagram illustrating a storage system according to an embodiment of the disclosure.

FIG. 1 is a block diagram illustrating a storage system according to an embodiment of the disclosure. Referring to FIG. 1, a storage system 100 may include a host 110 and a storage device 120. The storage system 100 may include at least one of various information processing devices such as a personal computer, a laptop computer, a server, a workstation, a smartphone, a tablet PC, etc.

The host 110 may store data "DATA" in the storage device 120 or may read the data "DATA" stored in the storage device 120. In an exemplary embodiment, the storage device 120 may be a key-value storage device. That is, the host 110 may control the storage device 120 based on a key-value pair.

For example, in a conventional block-based storage system, a host manages a storage space of a storage device by using a logical block address and controls the storage device based on the logical block address. That is, in the block-based storage system, the host controls the storage device based on the logical block address having a fixed length.

In contrast, the host 110 according to an embodiment of the disclosure may control the storage device 120 by using a key-value command CMD_KV (hereinafter referred to as a "KV command"). The KV command CMD_KV may include information corresponding to a key or a value. In an exemplary embodiment, unlike a conventional logical block address, a key provided from the host 110 may have a variable size. In an exemplary embodiment, a key-value pair may be a data management structure that is supported by a database such as a NoSQL database, and a KV command may indicate a command type that is supported by a database such as a NoSQL database.

In an exemplary embodiment, the KV command CMD_KV may have a configuration different from that of a command defined by conventional interfaces (e.g., PCIe, NVMe, SATA, IDE, UFS, and eMMC). In an exemplary embodiment, the KV command CMD_KV may be identical or similar to a command used in an application layer in types (e.g., GET, PUT, DEL, and LIST). Below, a configuration and a structure of the KV command CMD_KV will be more fully described with reference to drawings.

In response to the KV command CMD_KV from the host 110, the storage device 120 may store data "DATA" or may output the stored data "DATA". For example, the storage device 120 may include a storage controller 121 and a nonvolatile memory device 122. The nonvolatile memory device 122 may include a user key-value (KV) pair KVPR-user. The user KV pair KVPR-user may indicate a data structure including user data or a storage space in which user data are stored. The user KV pair KVPR-user will be more fully described with reference to FIG. 5.

In response to the KV command CMD_KV received from the host 110, the storage controller 121 may output data corresponding to a key included in the KV command CMD_KV from the user KV pair KVPR-user of the nonvolatile memory device 122 or may store a value included in the KV command CMD_KV in the user KV pair KVPR-user of the nonvolatile memory device 122.

For example, the storage controller 121 may include a key index IDX and a key-value (KV) manager 121a. The key index IDX may include information about a relationship between keys managed at the storage device 120 and locations where information or data corresponding the keys are stored. The key index IDX will be more fully described with reference to FIG. 5.

The KV manager 121a may search for a location of data corresponding to a key of the KV command CMD_KV received from the host 110, based on the key index IDX. The KV manager 121a may read data from the found location and may transmit the read data "DATA". Alternatively, the KV manager 121a may allocate a location of data corresponding to a key of the KV command CMD_KV received from the host 110 and may store a value included in the KV command CMD_KV at the allocated location as user data. The KV manager 121a may update the key index IDX, based on the allocated location and the key.

As described above, the host 110 and the storage device 120 of the storage system 100 may operate based on a key-value pair. In an exemplary embodiment, the storage controller 121 of the storage device 120 may further include an internal KV pair KVPR-int. The internal KV pair KVPR-int may indicate a key-value pair that is automatically managed by the storage device 120. The internal KV pair KVPR-int may include information about various operations or various administrative (herein abbreviated as "admin") operations that are supported by the storage device 120. The host 110 may access the internal KV pair KVPR-int and may control various admin operations of the storage device 120.

For example, in a conventional NVMe-based storage system, a host reads smart information of a storage device by using a Get Log Page command defined by the NVMe specification. In contrast, according to an embodiment of the disclosure, the internal KV pair KVPR-int of the storage controller 121 may include information for a Get Log Page command (in particular, SMART/HEALTH information). In this case, the host 110 may obtain the smart information from the storage device 120 by transferring the KV command CMD_KV including a key (or an internal key) corresponding to the Get Log Page command (e.g., a command for reading the SMART/HEALTH information) to the storage device 120. That is, the conventional storage system needs to define separate commands respectively associated with various admin operations of a storage device for supporting the admin operations. However, in the storage system 100 according to an embodiment of the disclosure, without defining a separate command for an admin operation, the host 110 may perform the admin operations by accessing the internal KV pair KVPR-int that is internally or autonomously managed by the storage device 120.

As described above, according to an embodiment of the disclosure, without defining separate commands for various admin operations, the host 110 may access the storage device 120 by using the KV command CMD_KV or may perform an admin operation on the storage device 120 by using the KV command CMD_KV. Accordingly, an interface between the host 110 and the storage device 120 is simplified, and thus, a storage system with improved performance and reduced costs is provided.

Figure 2:
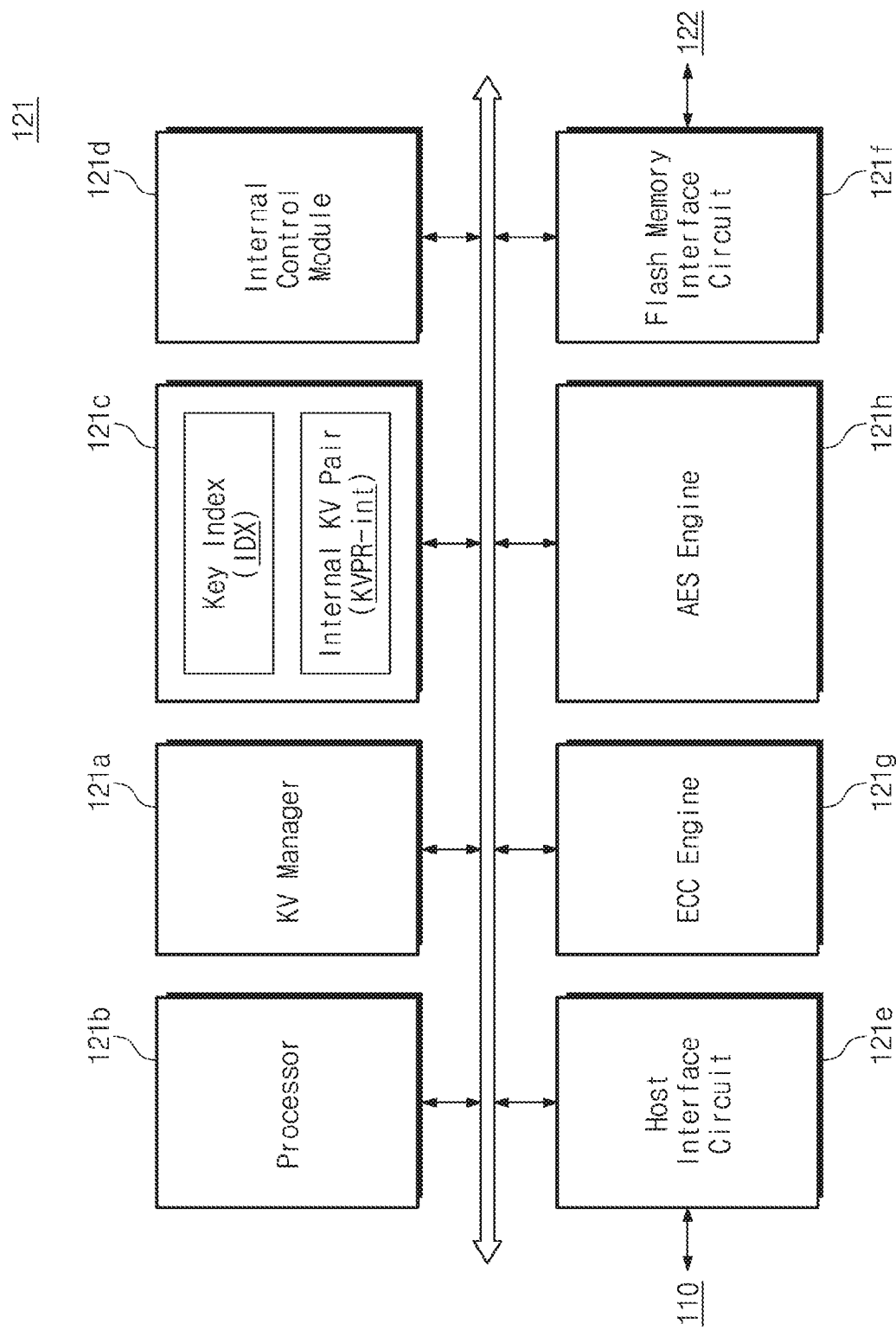
FIG. 2 is a block diagram illustrating a storage controller of FIG. 1.

FIG. 2 is a block diagram illustrating a storage controller of FIG. 1. Referring to FIGS. 1 and 2, the storage controller 121 may include the KV manager 121a, a processor 121b, a memory device 121c, an internal control module 121d, a host interface circuit 121e, and a flash memory interface circuit 121f. The KV manager 121a is described with reference to FIG. 1, and thus, additional description will be omitted to avoid redundancy.

The processor 121b may control overall operations of the storage controller 121. The memory device 121c may be used as a buffer memory, a cache memory, or a working memory of the storage controller 121. In an exemplary embodiment, the memory device 121c may include a volatile memory, such as a static random access memory (SRAM) or a dynamic RAM (DRAM), or a nonvolatile memory such as a flash memory, a magnetic RAM (MRAM), a resistive RAM (RRAM), or a phase change RAM (PRAM).

In an exemplary embodiment, the key index IDX and the internal KV pair KVPR-int may be stored in the memory device 121c. An example is illustrated in which the key index IDX and the internal KV pair KVPR-int are stored in the memory device 121c inside the storage controller 121, but the disclosure is not limited thereto. For example, the key index IDX and the internal KV pair KVPR-int may be stored in a buffer memory (not illustrated) (e.g., a DRAM) outside the storage controller 121.

The internal control module 121d may be configured to control an internal operation or an admin operation of the storage controller 121. For example, the internal control module 121d may be configured to perform various admin operations (e.g., a log information admin operation and a feature information admin operation) on the storage device 120 or the storage controller 121, in response to the KV command CMD_KV that includes a specific key (e.g., an internal key) and is provided from the host 110.

The storage controller 121 may be configured to communicate with the host 110 through the host interface circuit 121e. The host interface circuit 121e may be implemented based on a given interface protocol. In an exemplary embodiment, the given interface protocol may include at least one of various interface protocols such as a peripheral component interconnect express (PCI-express) interface, a nonvolatile memory express (NVMe) interface, a serial ATA (SATA) interface, a serial attached SCSI (SAS) interface, and a universal flash storage (UFS) interface, but the disclosure is not limited thereto. In an exemplary embodiment, the host interface circuit 121e may be implemented based on a key-value (KV) interface. The KV interface may be an interface configured to support the KV command such as GET, PUT, DEL, or LIST.

The storage controller 121 may communicate with the nonvolatile memory device 122 through the flash memory interface circuit 121f. In an exemplary embodiment, the flash memory interface circuit 121f may be implemented based on a NAND interface, a toggle interface, or an Open NAND Flash Interface (ONFI). In an exemplary embodiment, the flash memory interface circuit 121f may include a flash memory controller (not illustrated) (FMC) configured to independently control a plurality of nonvolatile memories included in the nonvolatile memory device 122.

In an exemplary embodiment, when the flash memory interface circuit 121f is implemented based on the toggle interface, the flash memory interface circuit 121f may connect to the nonvolatile memory device 122 through a plurality of signal lines. The plurality of signal lines may include communication lines for a chip enable signal /CE, a command latch enable signal CLE, an address latch enable signal ALE, a write enable signal /WE, a read enable signal /RE, data signals DQx, and a data storage signal DQS.

TABLE 1

| /CE | CLE | ALE | /WE | /RE | DQS | DQx | MODE |
|-----|-----|-----|-----|-----|-----|-----|------|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

A table 1 shows statuses of the signal lines for each mode. Referring to the table 1, the nonvolatile memory device may be enabled in response to the chip enable signal /CE having a low level L.

During the command input mode, the storage controller 121 may control the plurality of signal lines such that the command latch enable signal CLE is a high level H, the address latch enable signal ALE is the low level L, the write enable signal /WE toggles between the high level H and the low level L, the read enable signal is the high level H, and the command is transmitted through the data signals DQx. During the command input mode, the nonvolatile memory device may determine the data signals DQx received from the storage controller 121 as the command CMD. In an exemplary embodiment, during the command input mode, the storage controller 121 may transmit the command CMD through the data signals DQx, in synchronization with a rising edge of the write enable signal /WE, and the nonvolatile memory device may identify or latch the command CMD in response to the rising edge of the write enable signal /WE.

During the address input mode, the storage controller 121 may control the plurality of signal lines such that the command latch enable signal CLE is the low level L, the address latch enable signal ALE is the high level H, the write enable signal /WE toggles between the high level H and the low level L, the read enable signal is the high level H, and the address is transmitted through the data signals DQx. During the address input mode, the nonvolatile memory device may determine the data signals DQx received from the storage controller 121 as the address ADDR. In an exemplary embodiment, during the address input mode, the storage controller 121 may transmit the address ADDR through the data signals DQx, in synchronization with a rising edge of the write enable signal /WE, and the nonvolatile memory device may identify or latch the address ADDR in response to the rising edge of the write enable signal /WE. In an exemplary embodiment, the address ADD may be transmitted during five cycles of the write enable signal /WE, but this inventive concept is not limited thereto.

During the data input mode, the storage controller 121 may control the plurality of signal lines such that both the command latch enable signal CLE and the address latch enable signal ALE are the low level L and both the write enable signal /WE and the read enable signal are the high level H, the data strobe signal toggles between the high level H and the low level L, and the input data DATA_in is transmitted through the data signals DQx. During the data input mode, the nonvolatile memory device 122 may determine the data signals DQx received from the storage controller 121 as the input data DATA_in. In an exemplary embodiment, during the data input mode, the storage controller 121 may transmit the input data DATA_in through the data signals DQx, in synchronization with a rising edge and a falling edge of the data strobe signal DQS, and the nonvolatile memory device may identify or latch the input data DATA_in in response to the rising edge and the falling edge of the data strobe signal DQS.

During the data output mode, the storage controller 121 may control the plurality of signal lines such that both the command latch enable signal CLE and the address latch enable signal ALE are the low level L, the write enable signal /WE is the high level H, and the read enable signal toggles between the high level H and the low level. During the data output mode, the nonvolatile memory device 122 may control the plurality of signal lines such that output data DATA_out is transmitted through the data signals DQx and the data strobe signal DQS toggles between the high level H and the low level L. The storage controller 121 may determine the data signals DQx received from the nonvolatile memory device 122 as the output data DATA_out. In an exemplary embodiment, during the data output mode, the nonvolatile memory device 122 may generate the data strobe signal DQS using the read enable signal /RE, and transmit the output data DATA_out through the data signals DQx, in synchronization with a rising edge and a falling edge of the data strobe signal DQS. The storage controller 121 may identify or latch the output data DATA_out in response to the rising edge and the falling edge of the data strobe signal DQS.

In an exemplary embodiment, the plurality of signal lines may further include a communication line for a read and busy signal. The nonvolatile memory device may transmit the read and busy signal to the storage controller 121. In an exemplary embodiment, when the nonvolatile memory device has a busy status (e.g., the nonvolatile memory device 122 is performing a read operation, a program operation, or an erase operation), the read and busy signal may indicate a busy status. When the nonvolatile memory device has a ready status (e.g., the nonvolatile memory device does not perform an internal operation), the read and busy signal may indicate a read status. The storage controller may identify whether the nonvolatile memory device 122 has the busy status or the ready status in response to the ready and busy signal.

In an exemplary embodiment, the storage controller 121 may further include an error correction code (ECC) engine 121g and an advanced encryption standard (AES) engine 121h. The ECC enginge 121g may perform an error detection operation or an error correction operation for data read out from the nonvolatile memory device 122. For example, the ECC engine 121g may generate parity bits for write data to be stored in the nonvolatile memory device 122. The generated parity bits may be stored in the nonvolatile memory device 122 along with the write data. At a read operation on the write data stored in the nonvolatile memory device 122, the ECC engine 121g may detect or correct an error(s) in read data using the read data and corresponding parity bits to output error-corrected data.

The AES engine 121h may perform at least one of an encryption operation and a decryption operation for data inputted to the storage controller 111. In an exemplary embodiment, at least one of an encryption operation and a decryption operation may be performed using a symmetric-key algorithm.

In an exemplary embodiment, the KV manager 121a may be implemented in the form of software, hardware, or a combination thereof. In the case where the KV manager 121a is implemented in the form of software, a program or information associated with the KV manager 121a may be stored in the memory device 121c and may be driven or processed by the processor 121b. In the case where the KV manager 121a is implemented in the form of hardware, the KV manager 121a may be included in the host interface circuit 121e. However, the disclosure is not limited thereto. For example, the KV manager 121a may be implemented in the form of a separate module or separate hardware.

Figure 3A:
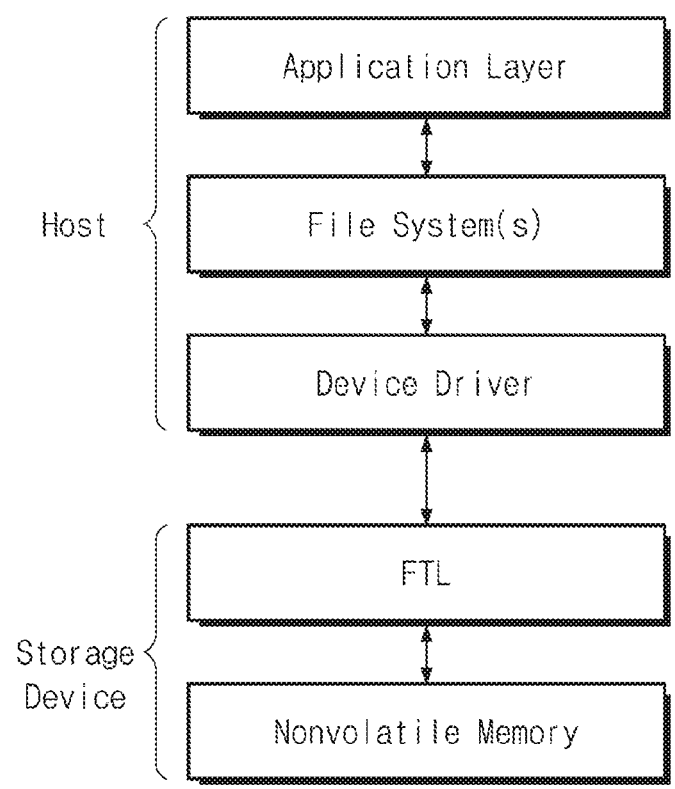
FIG. 3A is a diagram for describing a hierarchical structure of a block-based storage system.

FIG. 3A is a diagram for describing a hierarchical structure of a block-based storage system. For brevity of illustration and for convenience of description, reference numerals of components of FIG. 3A will be omitted. Referring to FIG. 3A, a host included in a block-based storage system includes an application layer, a file system, and a device driver. A storage device may include a flash translation layer (FTL) and a nonvolatile memory. The application layer may indicate various applications executable by the host. The file system is configured to organize a variety of information generated by the application layer. For example, the file system may manage data generated or requested by the application layer, based on a logical block address. The device driver may be configured to generate a request or a command to be transferred to a storage device or to process a request or a command received from the storage device, based on a logical block address that is managed by the file system. Alternatively, the device driver may be configured to generate commands for various admin operations to be performed by the storage device, in response to a request of the application layer. The flash translation layer may be configured to translate a logical block address of a command provided from the device driver to a physical address of a nonvolatile memory device and to manage mapping information between the logical block address and the physical address.

Figure 3B:
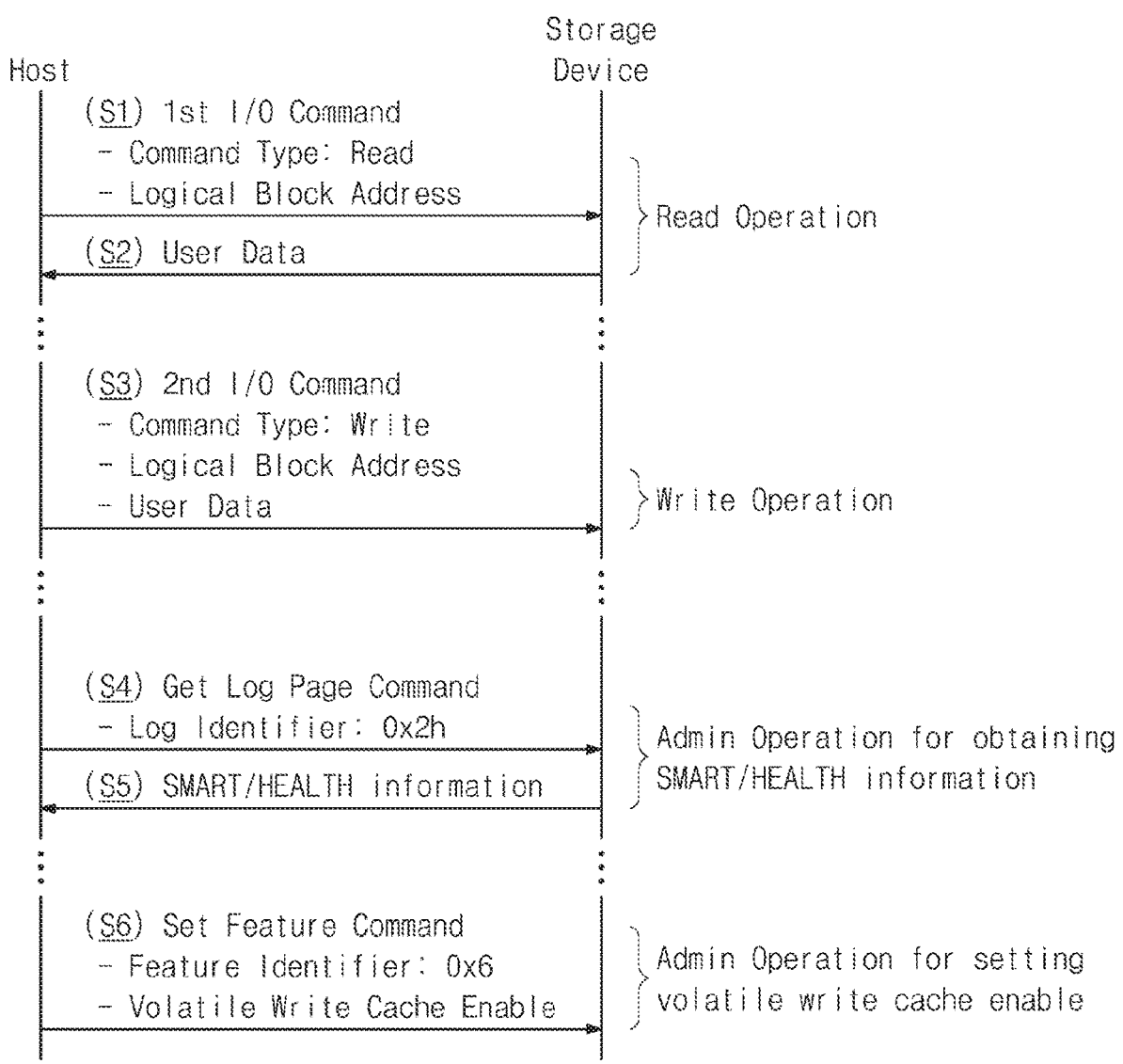
FIG. 3B is a flowchart for describing an operation of a block-based storage system of FIG. 3A.

FIG. 3B is a flowchart for describing an operation of a block-based storage system of FIG. 3A. Referring to FIGS. 3A and 3B, for a read operation, in operation S1, a host transmits a first input/output (I/O) command to a storage device. The first input/output command includes information indicating that a command type is "Read" and information about a Logical Block Address. In operation S2, the storage device transmits user data corresponding to the logical block address to the host in response to the first input/output command thus received.

Next, for a write operation, in operation S3, the host transmits the second input/output command to the storage device. The second input/output command includes information indicating that a command type is "Write", information about a Logical Block Address, and User Data to be written. In response to the second input/output command, the storage device may allocate a physical address corresponding to the Logical Block Address and may write the User Data in an area corresponding to the allocated physical address.

Then, for a specific admin operation (e.g., an admin operation for obtaining SMART/HEALTH information), in operation S4, the host transmits the Get Log Page command to the storage device. In this case, the Get Log Page command may include a log identifier of "0x3h". The log identifier of "0x3h" may be a log identifier corresponding to the SMART/HEALTH information. In operation S5, the storage device may transmit the SMART/HEALTH information to the host in response to the Get Log Page command.

Afterwards, for a specific admin operation (e.g., an admin operation for setting volatile write cache enable), in operation S6, the host may transmit a Set Feature command to the storage device. In this case, the Set Feature command may include a feature identifier of "0x6" and information about volatile write cache enable. The storage device may set a feature associated with the volatile write cache enable in response to the Set Feature command.

As described above, in a conventional block-based storage system, a host manages a storage device or data based on a logical block address, and the storage device translates the logical block address to a physical address and manages a result of the translation. In addition, in the conventional block-based storage system, the host performs various admin operations on the storage device by using a predefined command.

Figure 4A:
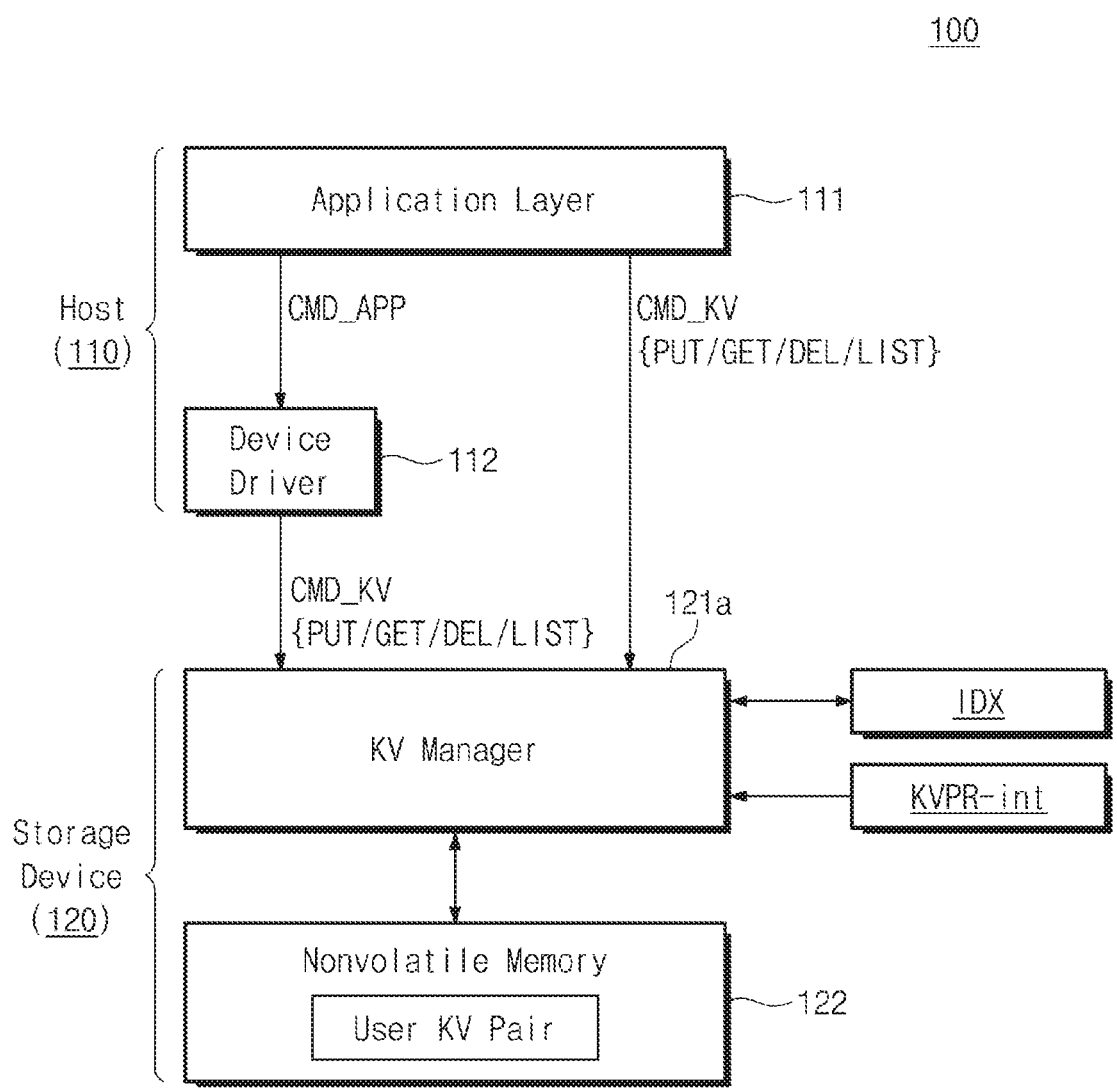
FIG. 4A is a block diagram illustrating a hierarchical structure of a storage system of FIG. 1.

FIG. 4A is a block diagram illustrating a hierarchical structure of a storage system of FIG. 1. Referring to FIGS. 1 and 4A, the storage system 100 may include the host 110 and the storage device 120.

The host 110 may include an application layer 111 and a device driver 112. The application layer 111 may include various application programs that are driven by the host 110.

The application layer 111 may issue an application command CMD_APP in the process of driving various application programs. The device driver 112 may convert the application command CMD_APP from the application layer 111 into the KV command CMD_KV. For example, the device driver 112 may convert the application command CMD_APP from the application layer 111 into the KV command CMD_KV that is in the form of GET, PUT, DEL, or LIST. The converted KV command CMD_KV may be transmitted to the storage device 120.

In an exemplary embodiment, in the case where the application layer 111 operates based on a key-value pair, the application layer 111 may generate the KV command CMD_KV. In this case, the KV command CMD_KV from the application layer 111 may be transmitted to the storage device 120 directly or through a given interface protocol, without separate conversion.

In an exemplary embodiment, the KV command CMD_KV may be one of GET, PUT, DEL, and LIST commands. The GET command may have a structure of GET[Key] including a key and may be used to read a value (e.g., data or information) corresponding to the key from the storage device 120. The PUT command may have a structure of PUT[Key, Value] including a key and a value and may be used to write or store a value corresponding to the key. The DEL command may have a structure of DEL[Key] including a key and may be used to delete a key-value pair or a value (e.g., data or information) corresponding to the key from the storage device 120. The LIST command may have a structure of LIST[Key1, Key2] including keys and may be used to check a value (e.g., data or information) corresponding to the keys Key1 and Key2 from the storage device 120. Kinds of the above-described KV commands are exemplary, and the disclosure is not limited thereto.

The storage device 120 may include the KV manager 121a and the nonvolatile memory device 122. The KV manager 121a may search for information corresponding to a key included in the KV command CMD_KV received from the host 110, based on the key index IDX, in response to the KV command CMD_KV. For example, in the case where the information corresponding to the key included in the KV command CMD_KV is present in the internal KV pair KVPR-int, the KV manager 121a may read the information corresponding to the key of the KV command CMD_KV from the internal KV pair KVPR-int and may perform an operation corresponding to the read information. Alternatively, in the case where the information corresponding to the key included in the KV command CMD_KV is present in the user KV pair KVPR-user, the KV manager 121a may read data corresponding to the key of the KV command CMD_KV from the user KV pair KVPR-user of the nonvolatile memory device 122 and may transmit the read data to the host 110.

Figure 4B:
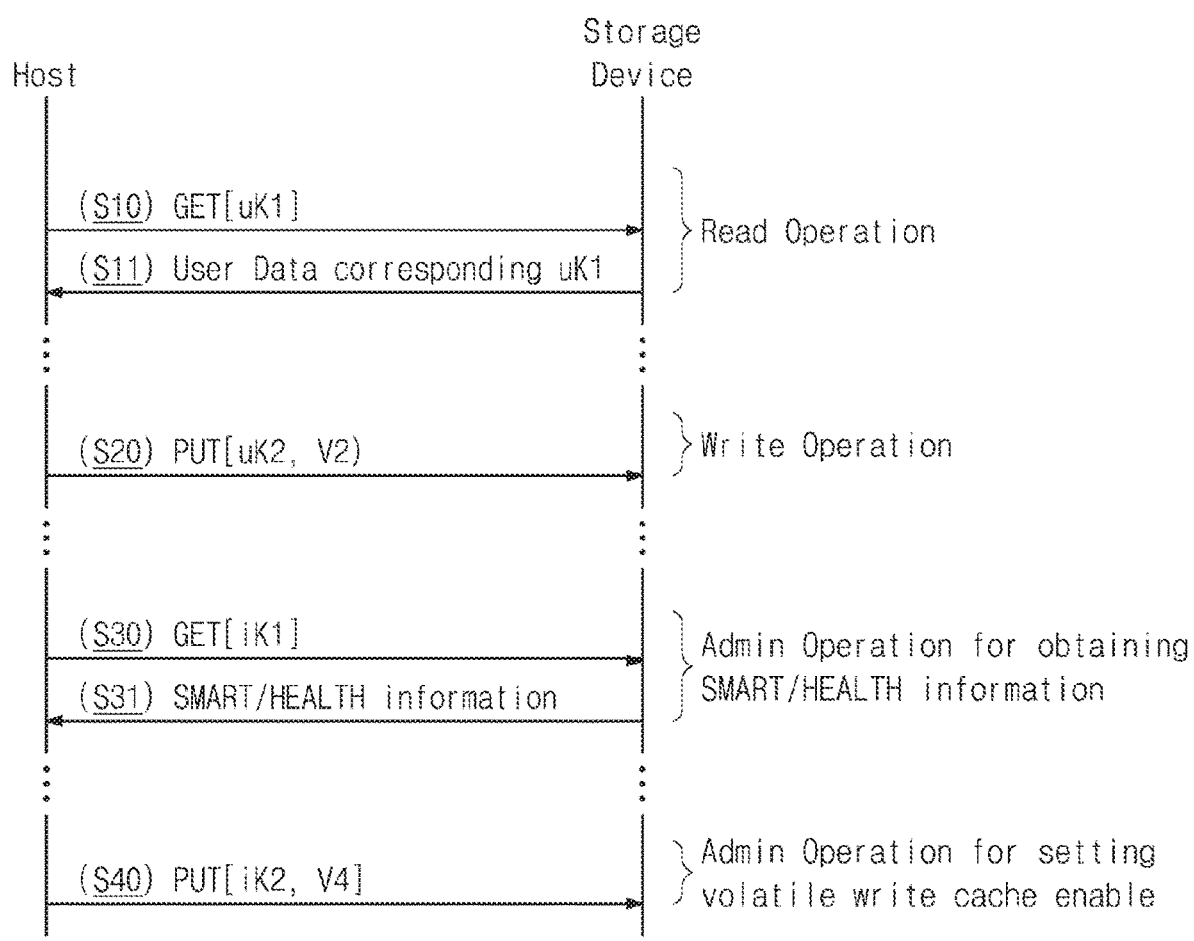
FIG. 4B is a flowchart illustrating an operation of a storage system of FIGS. 1 and 4A.

FIG. 4B is a flowchart illustrating an operation of a storage system of FIGS. 1 and 4A. Below, for convenience of description, the terms "internal key iK", "user key uK", etc. are used. The internal key iK may indicate a key corresponding to information included in the internal KV pair KVPR-int, and the user key uK may indicate a key corresponding to user data included in the user KV pair KVPR-user. Also, below, the terms "GET", "PUT", "DEL", "LIST", etc. are used. The terms "GET", "PUT", "DEL", "LIST", etc. are terms for identifying a type of the KV command CMD_KV, and a KV command according to the technical idea of the disclosure is not limited thereto.

Referring to FIGS. 1, 4A, and 4B, for a read operation, in operation S10, the host 110 may transmit a first KV command to the storage device 120. In this case, the first KV command may have a structure of GET[uK1]. A command type of "GET" may be a command type for reading data or information from the storage device 120. That is, the KV command of GET[uK1] may be a command for reading user data corresponding to a first user key uK1.

In operation S11, the storage device 120 may transmit user data corresponding to the first user key uK1 to the host 110, in response to GET[uK1] received from the host 110.

Next, for a write operation, in operation S20, the host 110 may transmit a second KV command to the storage device 120. In this case, the second KV command may have a structure of PUT[uK2, V2]. A command type of "PUT" may be a command type for storing data or information in the storage device 120. That is, the KV command of PUT[uK2, V2] may be a command for storing a second value V2 as user data corresponding to a second user key uK2. In response to the KV command of PUT[uK2, V2], the storage device 120 may store the second value V2 as user data corresponding to the second user key uK2 in the user KV pair KVPR-user of the nonvolatile memory device 122. In an exemplary embodiment, after the store operation is completed, the storage device 120 may update the key index IDX based on a location where the second value V2 is stored and the second user key uK2.

Next, for a specific admin operation (e.g., an admin operation for obtaining SMART/HEALTH information), in operation S30, the host 110 may transmit a third KV command to the storage device 120. In this case, the third KV command may have a structure of GET[iK1]. A value corresponding to the first internal key iK1 may correspond to a command for an admin operation (e.g., Get Log Page) for obtaining SMART/HEALTH information. The value corresponding to the first internal key iK1 may be stored in the internal KV pair KVPR-int.

That is, to perform the specific admin operation, without using a separately defined command, the host 110 may perform the specific admin operation by using the KV command of "GET" used to read user data and an internal key (i.e., the first internal key iK1) corresponding to the specific admin operation.

In operation S31, in response to GET[iK1], the storage device 120 may perform an operation corresponding to the specific admin operation, for example, may transmit SMART/HEALTH information. For example, the storage device 120 may check information (i.e., a command corresponding to an admin operation for obtaining SMART/HEALTH information) corresponding to the first internal key iK1 of GET[iK1] from the internal KV pair KVPR-int and may perform an operation corresponding to the checked information, for example, an operation of transmitting SMART/HEALTH information.

Next, for another specific admin operation (e.g., an admin operation for setting volatile write cache enable), in operation S40, the host 110 may transmit a fourth KV command to the storage device 120. In this case, the fourth KV command may have a structure of PUT[iK2, V4]. A value corresponding to the second internal key iK2 may correspond to a command for an admin operation (e.g., Set Feature) for obtaining a volatile write cache enable feature. The value corresponding to the second internal key iK2 may be stored in the internal KV pair KVPR-int.

In response to PUT[iK2, V4], the storage device 120 may perform an admin operation corresponding to the second internal key iK2, that is, an operation of setting a volatile write cache enable feature to the second value V4.

As described above, the storage system 100 according to an embodiment of the disclosure may perform an input/output operation and an admin operation on the storage device 120, based on the KV command CMD_KV.

For example, as described with reference to FIGS. 3A and 3B, in the block-based storage system, commands for an input/output operation and commands for an admin operation have to be defined independently or individually. In contrast, the storage system 100 according to an embodiment of the disclosure may perform various operations by using integrated KV commands CMD_KV without individually defining commands for an input/output operation and commands for an admin operation. Accordingly, an interface between the host 110 and the storage device 120 may be simplified. In addition, because the application layer 111 of the host 110 is capable of directly controlling the storage device 120 or is capable of controlling the storage device 120 only through a minimum of signal conversion (e.g., a signal conversion through a physical port), the hierarchical structure of the host 110 may be simplified.

Figure 5:
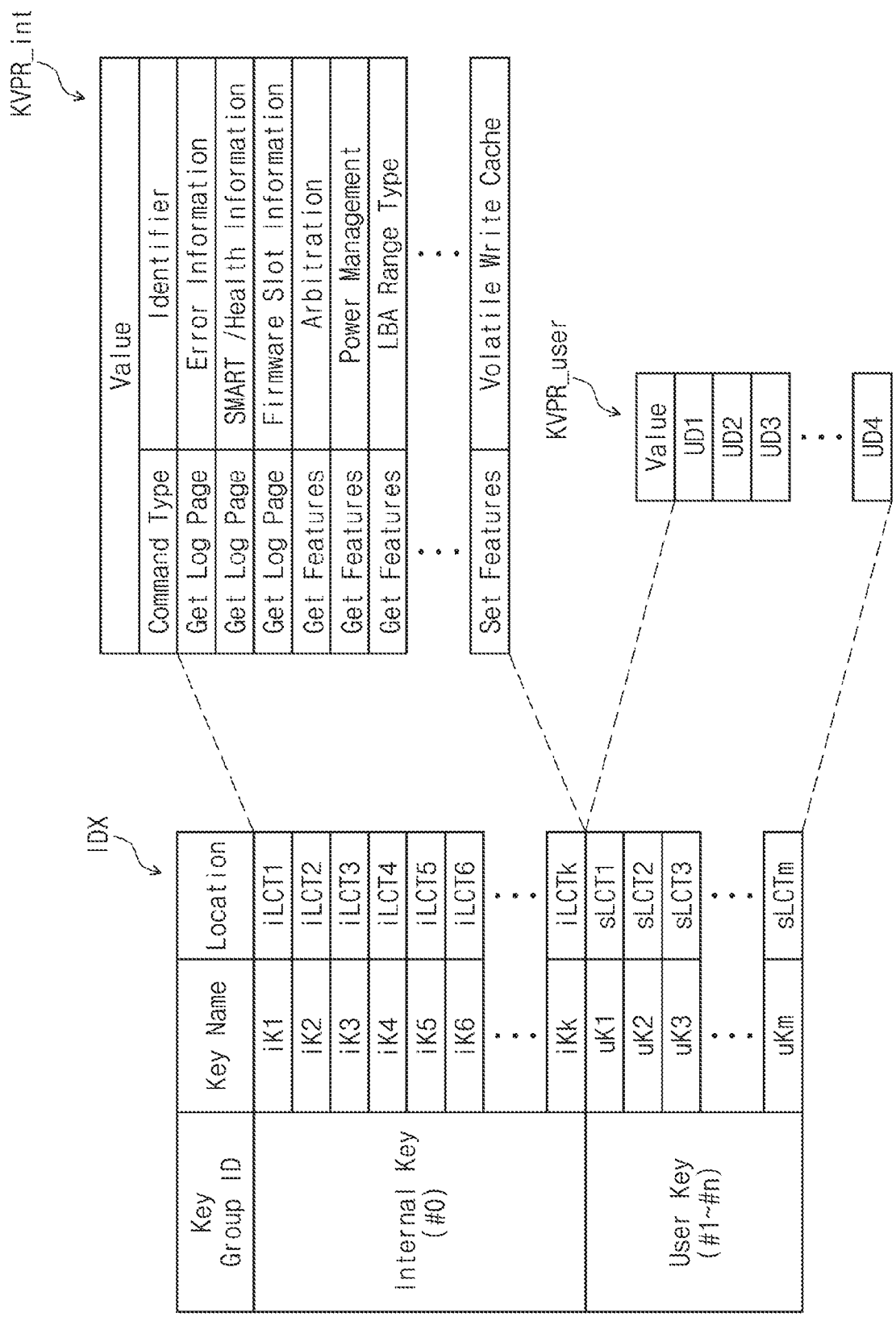
FIG. 5 is a diagram for describing a key index, an internal KV pair, and a user KV pair of FIG. 1.

FIG. 5 is a diagram for describing a key index, an internal KV pair, and a user KV pair of FIG. 1. For convenience of description, components that are unnecessary to describe the key index IDX, the internal KV pair KVPR-int, and the user KV pair KVPR-user are omitted. For brevity of illustration, a partial data structure of the key index IDX, the internal KV pair KVPR-int, and the user KV pair KVPR-user is illustrated in FIG. 5, but the disclosure is not limited thereto.

Referring to FIGS. 1 and 5, the key index IDX may include information about a key group identifier Key Group ID. The key group identifier Key Group ID may be used to classify features of keys. For example, first to k-th internal keys iK1 to iKk may be keys that are managed within the storage device 120. That is, the first to k-th internal keys iK1 to iKk may be keys corresponding to various admin operations associated with the storage device 120, regardless of user data. Alternatively, values corresponding to the first to k-th internal keys iK1 to iKk may be stored in the internal KV pair KVPR-int. A key group identifier of a 0-th group #0 may be allocated to the first to k-th internal keys iK1 to iKk.

In contrast, first to m-th user keys uK1 to uKm may be keys corresponding to user data UD1 to UD4 included in the user KV pair KVPR-user of the nonvolatile memory device 122. That is, the first to m-th user keys uK1 to uKm may be keys that are managed by the host 110 or respectively correspond to actual user data. Key group identifiers of first to m-th groups #1 to #n may be allocated to the first to m-th user keys uK1 to uKm, respectively.

In an exemplary embodiment, the KV command CMD_KV received from the host 110 may include information about a key group identifier and a key name That is, the KV manager 121a of the storage controller 121 may determine whether a key corresponding to a key name included in the KV command CMD_KV is an internal key or a user key, based on a key group identifier of the KV command CMD_KV received from the host 110. In other words, as key group identifiers are differently allocated to a plurality of keys iK1-iKk and uK1-uKm on an internal key or user key basis, whether a key of a KV command received from the host 110 is an internal key or a user key may be determined. In addition, even though key names of an internal key and a user key duplicate, the internal key and the user key may be distinguished from each other.

Below, for convenience of description and for brevity of illustration, it is assumed that the term "key", "internal key", or "user key" or configurations include information about a corresponding key group identifier. That is, an internal key may include information about a key group identifier corresponding to the internal key and a key name of the internal key, and a user key may include information about a key group identifier corresponding to the user key and a key name of the user key. However, the disclosure is not limited thereto. For example, in the case where key names of an internal key and a user key are managed not to duplicate, a key group identifier may be omitted.

The key index IDX may include information about a key name and a location. For example, the key index IDX may include information about key names (e.g., iK1 to iKk and uK1 to uKm) and locations iLCT1 to iLCTk and sLCT1 to sLCTm corresponding to the key names. That is, the first internal location iLCT1 may indicate a location where a value corresponding to the first internal key iK1 is stored, and the k-th internal location iLCTk may indicate a location where a value corresponding to the k-th internal key iKk is stored. The first storage location sLCT1 may indicate a location where a value corresponding to the first user key uK1 is stored, and the m-th storage location sLCTm may indicate a location where a value corresponding to the m-th user key uKm is stored.

In an exemplary embodiment, the first to k-th internal locations iLCT1 to iLCTk may indicate memory addresses or locations associated with the memory device 121c, and the first to m-th storage locations sLCT1 to sLCTm may indicate memory addresses, physical addresses, or logical addresses associated with the nonvolatile memory device 122.

The internal KV pair KVPR-int may include values respectively corresponding to the first to k-th internal keys iK1 to iKk. For example, a value corresponding to the first internal key iK1 may be information corresponding to "a Get Log Page command in which an identifier is set to error information". A value corresponding to the second internal key iK2 may be information corresponding to "a Get Log Page command in which an identifier is set to SMART/HEALTH information". Likewise, values respectively corresponding to the third to k-th internal keys iK3 to iKk may be information corresponding to "a Get Log Page command in which an identifier is F/W Slot information", "a Get Features command in which an identifier is Arbitration", "a Get Features command in which an identifier is Power Management", "a Get Features command in which an identifier is LBA Range Type", and "a Set Features in which an identifier is Volatile Write Cache". In an exemplary embodiment, the internal KV pair KVPR-int may be stored in the memory device 121c included in the storage controller 121 or in a buffer memory (not illustrated) (e.g., a DRAM buffer) provided independently of the storage controller 121.

The KV manager 121a may perform various admin operations on the storage device 120 based on information of the internal KV pair KVPR-int. For example, in the case where the KV command CMD_KV of GET[iK2] is received from the host 110, the KV manager 121a may check the second internal location iLCT2 corresponding to the second internal key iK2 based on the key index IDX and may detect a value (i.e., a Get Log Page command in which an identifier is SMART/HEALTH Information) stored at the second internal location iLCT2 from the internal KV pair KVPR-int. The KV manager 121a may perform a corresponding operation (i.e., an operation of outputting SMART/HEALTH Information) in response to the detected value.

An example illustrated in FIG. 5 as the internal KV pair KVPR-int includes some admin commands, but the disclosure is not limited thereto. The internal KV pair KVPR-int may include, as values of internal keys, admin commands for various admin operations, such as an Abort command, an Asynchronous Event Request command, a Create I/O Completion Queue command, a Create I/O Submission Queue command, a Delete I/O Completion Queue command, a Delete I/O Submission Queue command, a Doorbell Buffer Config command, a Device Self-test command, a Directive Receive command, a Directive Send command, a Firmware Commit command, a Firmware Image Download command, a Get Features command, a Get Log Page command, an Identify command, a Keep Alive command, an NVMe-MI Receive command, an NVMe-MI Send command, a Namespace Attachment command, a Namespace Management command, a Set Features command, a Virtualization Management command, a Format command, a Sanitize command, a Security Receive command, a Security Send command, and a Get LBA Status command, or information about various field values respectively corresponding to the admin commands.

The user KV pair KVPR-user may include values respectively corresponding to the first to k-th user keys uK1 to uKm. For example, a value corresponding to the first user key uK1 may be first user data UD1, and a value corresponding to the second user key uK2 may be second user data UD2. Likewise, values respectively corresponding to the third to m-th user keys uK3 to uKm may be third to m-th user data UD3 to UD4. The user KV pair KVPR-user may be stored in the nonvolatile memory device 122.

In the case where the user key uK is received from the host 110, the KV manager 121a may determine a storage location, at which a value corresponding to the received user key uK is stored, based on the key index IDX and may read the corresponding value from the user KV pair KVPR-user based on the determined storage location. Alternatively, in the case where the user key uK and a value are received from the host 110, the KV manager 121a may store the value in the user KV pair KVPR-user of the nonvolatile memory device 122 and may update the key index IDX based on the user key and a storage location where the value is stored.

Figure 6:
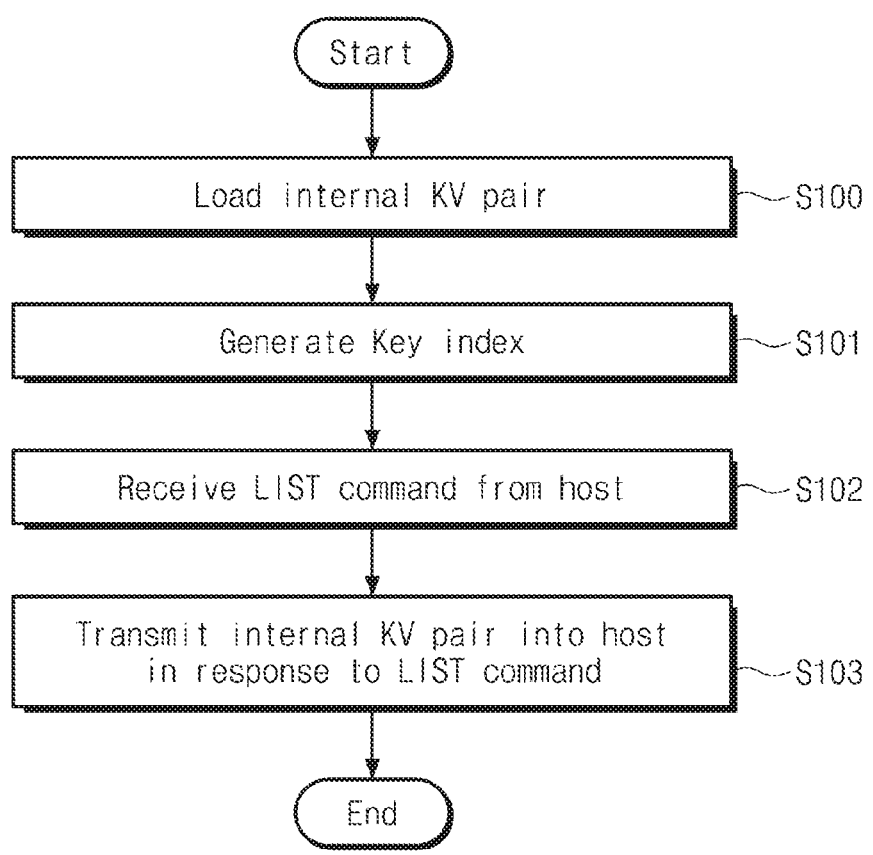
FIG. 6 is a flowchart illustrating an initial operation of a storage device of FIG. 1.
Figure 7:
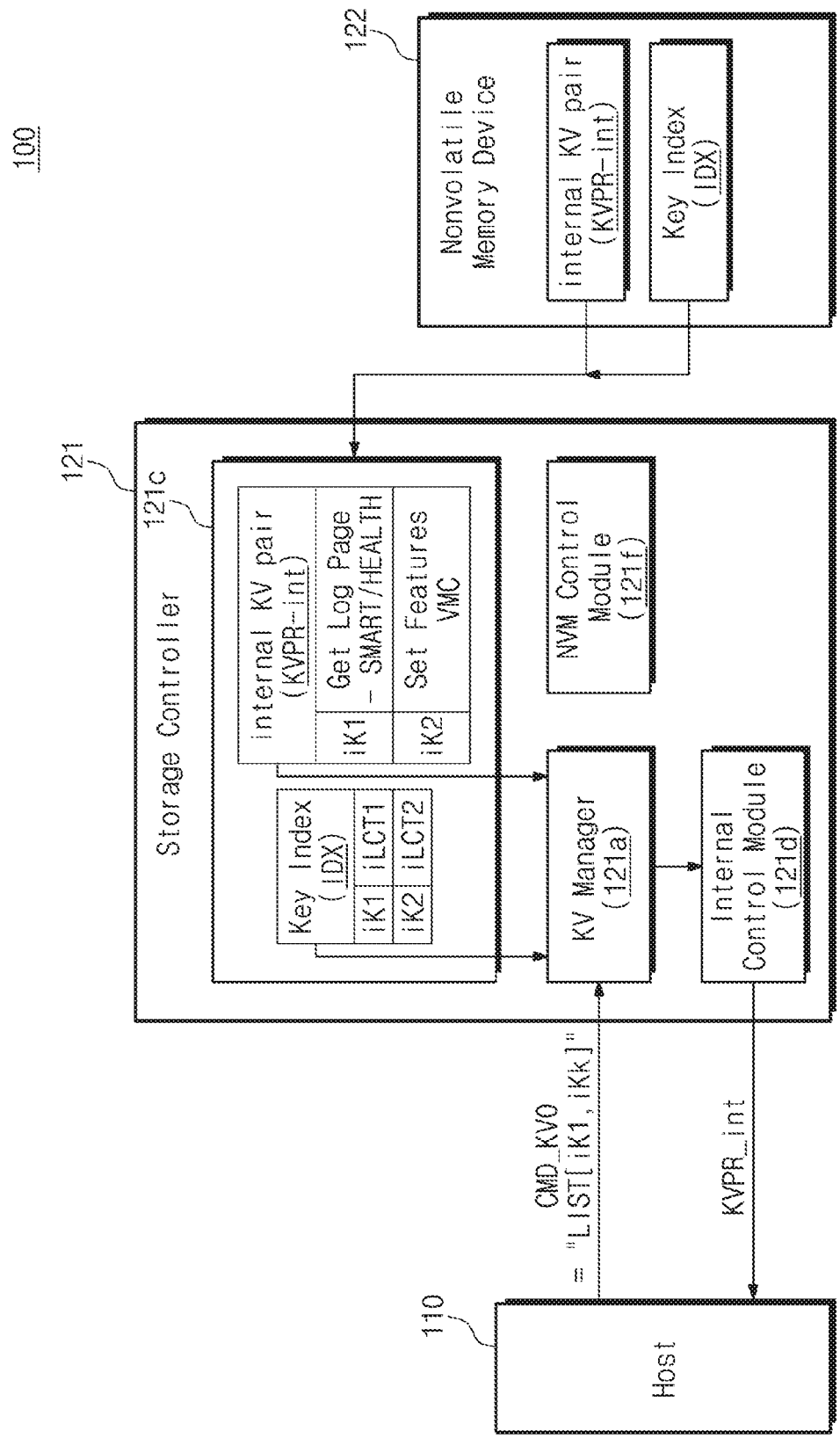
FIG. 7 is a block diagram for describing an initial operation according to the flowchart of FIG. 6.

FIG. 6 is a flowchart illustrating an initial operation of a storage device of FIG. 1. FIG. 7 is a block diagram for describing an initial operation according to the flowchart of FIG. 6. For convenience of description, components that are unnecessary to describe an initial operation of the storage device 120 are omitted.

Below, for convenience of description, the detailed description of redundant components is omitted. To describe an embodiment of the disclosure clearly, it is assumed that the KV manager 121a performs an operation of determining a key from the host 110 and an operation of accessing the internal KV pair KVPR-int, and the internal control module 121d performs an admin operation associated with the storage device 120, and the NVM control module 121f (i.e., a flash memory interface circuit of FIG. 2) performs a control operation on the nonvolatile memory device 122. However, the disclosure is not limited thereto. For example, operations according to an embodiment of the disclosure may be performed by the KV manager 121a or may be performed by any other components included in the storage controller 121 or the storage device 120.

Referring to FIGS. 1, 6, and 7, in operation S100, the storage device 120 may load the internal KV pair KVPR-int. For example, as described above, the internal KV pair KVPR-int may include information corresponding to various admin operations executable by the storage device 120 or a value corresponding to an internal key. As illustrated in FIG. 7, the internal KV pair KVPR-int may be stored in the nonvolatile memory device 122. Alternatively, the internal KV pair KVPR-int may be stored in a separate storage space in the form of firmware. In an initial operation or initialization operation of the storage device 120, the internal KV pair KVPR-int stored in the nonvolatile memory device 122 may be loaded onto the memory device 121c of the storage controller 121.

In operation S101 of FIG. 6, the storage device 120 may generate the key index IDX. For example, as described with reference to FIG. 5, the key index IDX may include a plurality of keys and location information. The storage device 120 may generate the key index IDX based on internal keys corresponding to values of the loaded internal KV pair KVPR-int and locations (i.e., locations on the memory device 121*c*) where the values are stored.

Alternatively, as illustrated in FIG. 7, the key index IDX may be stored in the nonvolatile memory device 122, and the key index IDX stored in the nonvolatile memory device 122 may be loaded onto the memory device 121*c*. In an exemplary embodiment, although not illustrated in drawing, the key index IDX stored in the nonvolatile memory device 122 may include information about locations and user keys of values of the user KV pair KVPR-user included in the nonvolatile memory device 122. That is, the key index IDX stored in the nonvolatile memory device 122 may include information about previously stored user data.

Afterwards, in operation S102 of FIG. 6, the storage device 120 may receive a KV command (e.g., a LIST command) from the host 110. For example, as illustrated in FIG. 7, the host 110 may transmit a 0-th KV command CMD_KV0 to the storage device 120. The 0-th KV command CMD_KV0 may have a command structure of LIST [iK1,iKk]. The "LIST" command may be a command that is used to find values between specific keys. That is, the host 110 may transmit the KV command of LIST[iK1~iKk] to the storage device 120 for the purpose of finding values corresponding to the internal keys iK1 to iKk.

In operation S103 of FIG. 6, the storage device 120 may transmit information about the internal KV pair KVPR-int to the host 110, based on the key index IDX, in response to the KV command (e.g., the LIST command) from the host 110. For example, as illustrated in FIG. 7, the KV manager 121*a* of the storage controller 121 may determine internal locations iLCT corresponding to the first to k-th internal keys iK1 to iKk based on the key index IDX in response to the 0-th KV command CMD_KV0, that is, LIST[iK1,iKk] and may detect corresponding values from the internal KV pair KVPR-int based on the determined internal locations. The internal control module 121*d* may transmit the detected values as the internal KV pair KVPR-int to the host 110 under control of the KV manager 121*a*.

As described above, the storage device 120 according to an embodiment of the disclosure may load the internal KV pair KVPR-int, which is in advance stored or determined, onto the memory device 121*c*, in the initial operation. In this case, to check an admin operation that is supported by the storage device 120, the host 110 may check the internal KV pair KVPR-int by using the KV command CMD_KV (e.g., the LIST command). Afterwards, the host 110 may control various admin operations of the storage device 120 based on the checked internal KV pair KVPR-int.

In an exemplary embodiment, when information about the internal KV pair KVPR-int is in advance determined between the host 110 and the storage device 120 or is in advance defined by an interface protocol between the host 110 and the storage device 120, an operation of checking the internal KV pair KVPR-int may be omitted.

In an exemplary embodiment, the operation described with reference to FIGS. 6 and 7 may be performed in the initialization operation of the storage system 100, may be periodically performed while the storage system 100 is being driven, or may be randomly performed by a separate request.

Figure 8:
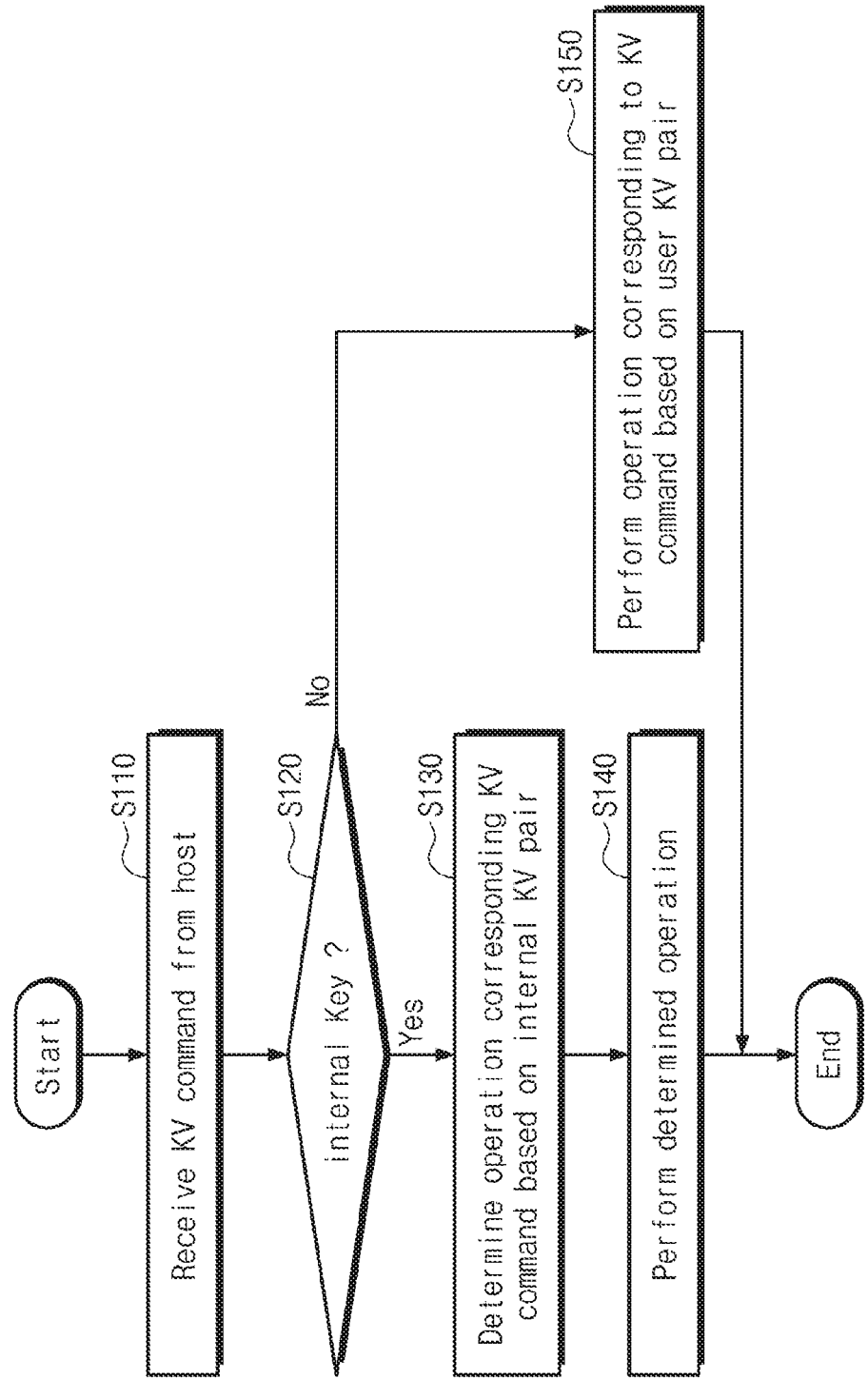
FIG. 8 is a flowchart illustrating an operation of a storage device of FIG. 1.

FIG. 8 is a flowchart illustrating an operation of a storage device of FIG. 1. Below, for convenience of description, the detailed description of redundant components is omitted. Referring to FIGS. 1 and 8, in operation S110, the storage device 120 may receive the KV command CMD_KV from the host 110. A structure of the KV command CMD_KV is described above, and thus, additional description will be omitted to avoid redundancy.

In operation S120, the storage device 120 may determine whether a key included in the received KV command CMD_KV is an internal key. For example, the KV manager 121*a* of the storage controller 121 may determine whether the key of the KV command CMD_KV is an internal key, based on the key index IDX.

When the key of the KV command CMD_KV is an internal key, in operation S130, the storage device 120 may determine an operation corresponding to the KV command CMD_KV, based on the internal KV pair KVPR-int. For example, as described above, the internal KV pair KVPR-int may include values respectively corresponding to internal keys. The values included in the internal KV pair KVPR-int may correspond to various admin operations of the storage device 120. Accordingly, the storage device 120 may determine an operation (e.g., an admin operation) corresponding to the KV command CMD_KV, based on a value corresponding to the key (i.e., internal key) of the KV command CMD_KV. In operation S140, the storage device 120 may perform the determined operation.

When the key of the KV command CMD_KV is not an internal key (e.g., is a user key), in operation S150, the storage device 120 may perform an operation corresponding to the KV command CMD_KV, based on the user KV pair KVPR-user. For example, the storage device 120 may check a location, at which a value corresponding to the key (e.g., the user key) of the KV command CMD_KV is stored, based on the key index IDX and may transmit user data from the user KV pair KVPR-user, based on the checked location. Alternatively, the storage device 120 may store a value corresponding to the key (e.g., the user key) of the KV command CMD_KV in the user KV pair KVPR-user and may update the key index IDX, based on the value-stored location and the key (e.g., the user key) of the KV command CMD_KV.

FIGS. 9A to 9E are diagrams for describing an operation according to the flowchart of FIG. 8 in detail. Below, for convenience of description, the detailed description of redundant components is omitted. Also, for convenience of description, it is assumed that the first internal key iK1 corresponds to a Get Log Page command for obtaining SMART/HEALTH information and the second internal key iK2 corresponds to a Set Features command for setting a volatile write cache (VWC) function.

Referring to FIGS. 1 and 9A to 9E, the storage system 100 may include the host 110 and the storage device 120. The storage device 120 may include the storage controller 121 and the nonvolatile memory device 122. The storage controller 121 may include the KV manager 121*a*, the memory device 121*c*, the internal control module 121*d*, and the NVM control module 121*f*. The memory device 121*c* may include the key index IDX and the internal KV pair KVPR-int. The nonvolatile memory device 122 may include the user key-value (KV) pair KVPR-user.

Figure 9A:
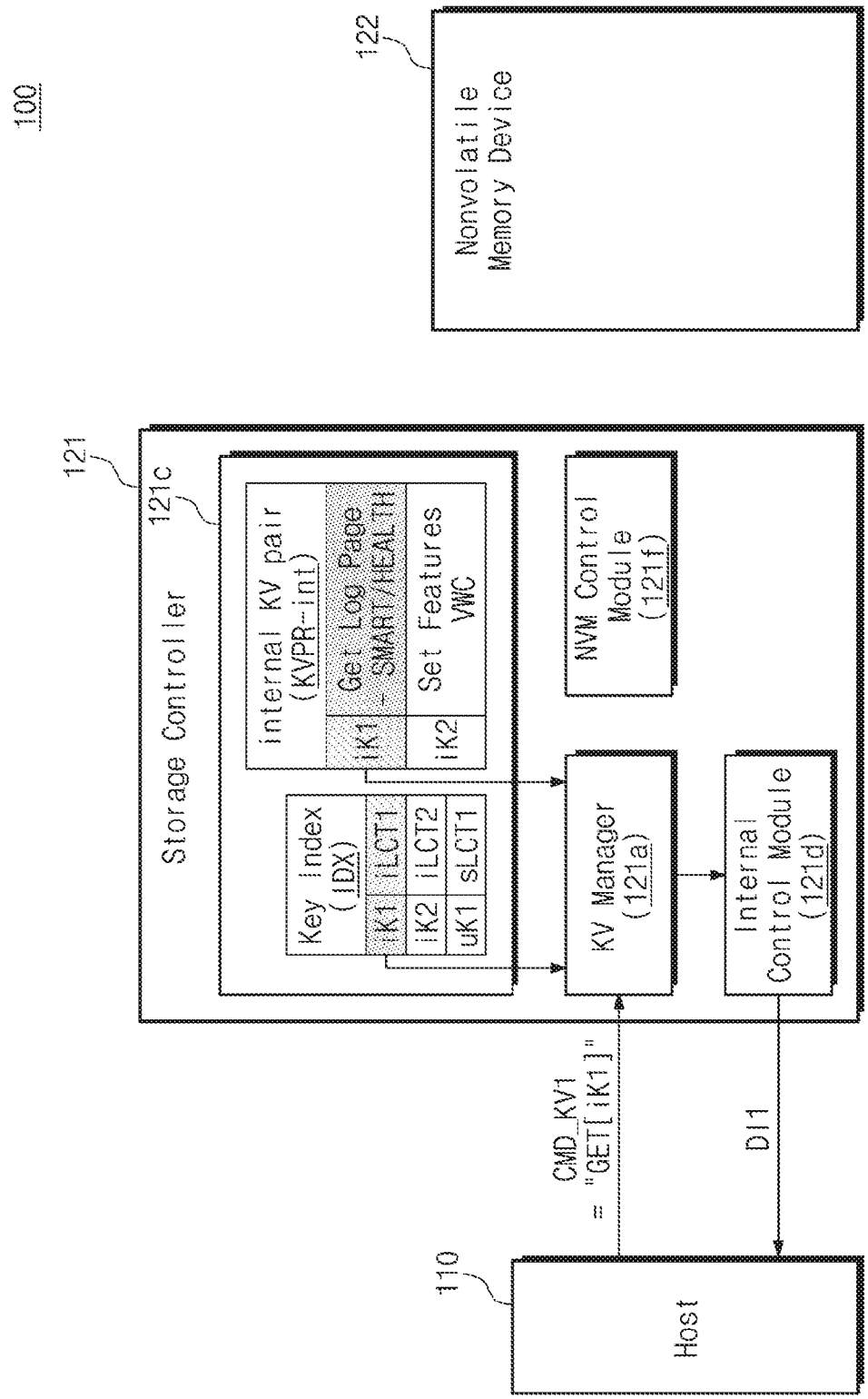
FIGS. 9A to 9E are diagrams for describing an operation according to the flowchart of FIG. 8 in detail.

First, a configuration for performing a first admin operation (e.g., a Get Log Page operation for obtaining SMART/HEALTH information) is described with reference to FIG. 9A. As illustrated in FIG. 9A, the host 110 may transmit a first KV command CMD_KV1 to the storage controller 121 for the purpose of performing the first admin operation. The first KV command CMD_KV1 may have a command structure or a command format of GET[iK1].

The KV manager 121*a* of the storage controller 121 may check that the first internal key iK1 of the first KV command CMD_KV1 is an internal key, based on the key index IDX (e.g., based on a key group identifier). The KV manager 121a may check the first internal location iLCT1 corresponding to the first internal key iK1 based on the key index IDX and may obtain a value (i.e., Get Log Page—SMART/HEALTH) corresponding to the first internal key iK1 from the internal KV pair KVPR-int based on the first internal location iLCT1. The KV manager 121a may control the internal control module 121d, based on the obtained value (i.e., Get Log Page—SMART/HEALTH).

The internal control module 121d may perform the first admin operation corresponding to the obtained value (i.e., Get Log Page—SMART/HEALTH), under control of the KV manager 121a. For example, the internal control module 121d may transmit first device information DI1 to the host 110 as a result of the first admin operation. In an exemplary embodiment, the first device information DI1 may be SMART/HEALTH information.

Figure 9B:
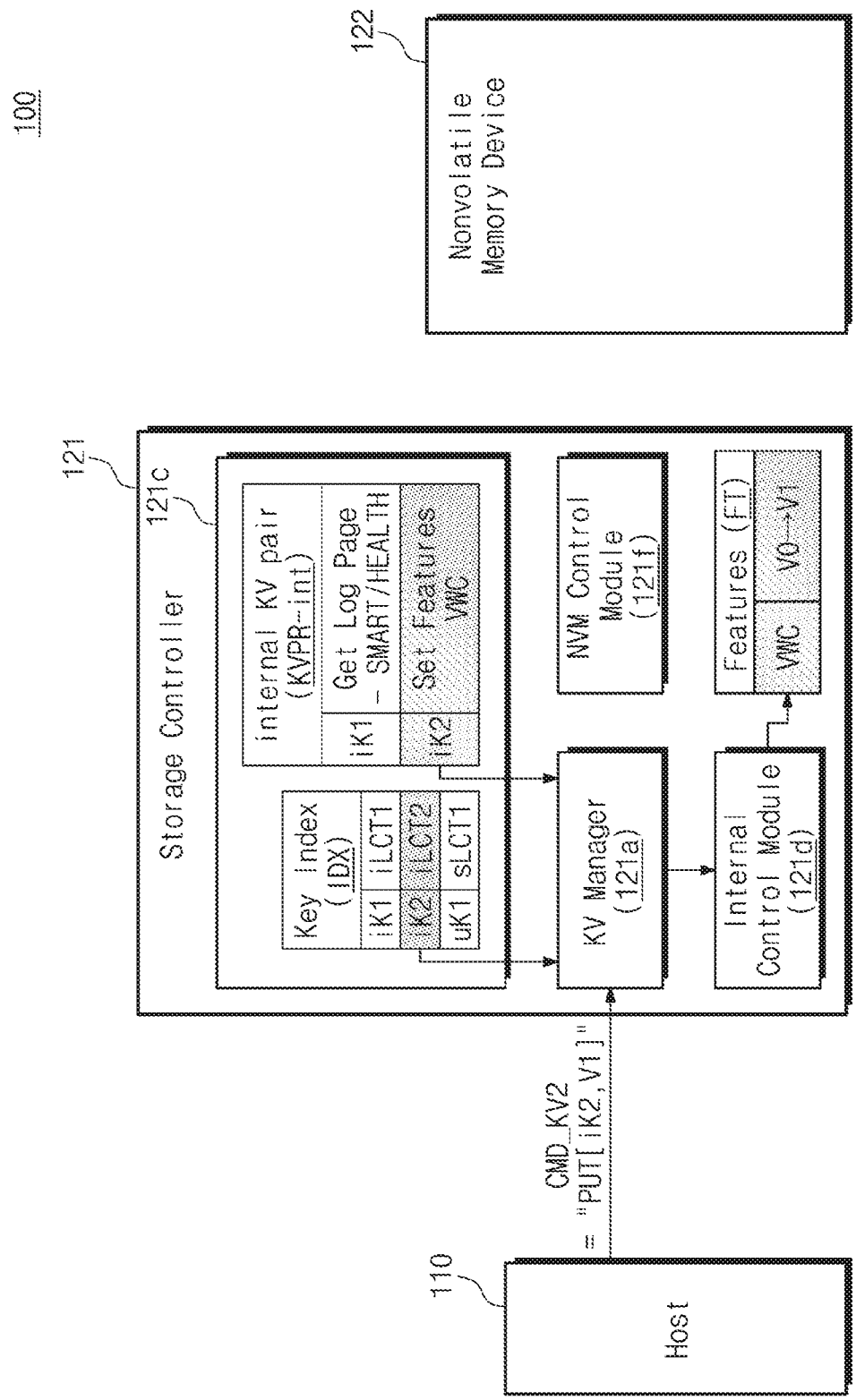

Next, a configuration for performing a second admin operation (e.g., a Set Features operation for setting a volatile write cache) is described with reference to FIG. 9B. As illustrated in FIG. 9B, the host 110 may transmit a second KV command CMD_KV2 to the storage controller 121 for the purpose of performing the second admin operation. The second KV command CMD_KV2 may have a command structure or a command format of PUT[iK2, V1].

The KV manager 121a of the storage controller 121 may check that the second internal key iK2 of the second KV command CMD_KV2 is an internal key, based on the key index IDX (e.g., based on a key group identifier). The KV manager 121a may check the second internal location iLCT2 corresponding to the second internal key iK2 based on the key index IDX and may obtain a value (i.e., Set Features—VWC) corresponding to the second internal key iK2 from the internal KV pair KVPR-int based on the second internal location iLCT2. The KV manager 121a may control the internal control module 121d, based on the obtained value (i.e., Set Features—VWC).

The internal control module 121d may perform the second admin operation corresponding to the obtained value (i.e., Set Features—VWC), under control of the KV manager 121a. For example, the internal control module 121d may update information about the volatile write cache VWC among features FT (or a register at which information about the features FT are stored) from a 0-th value to a first value (V0→V1). In this case, the first value V1 may be a value included in the second KV command CMD_KV2.

Figure 9C:
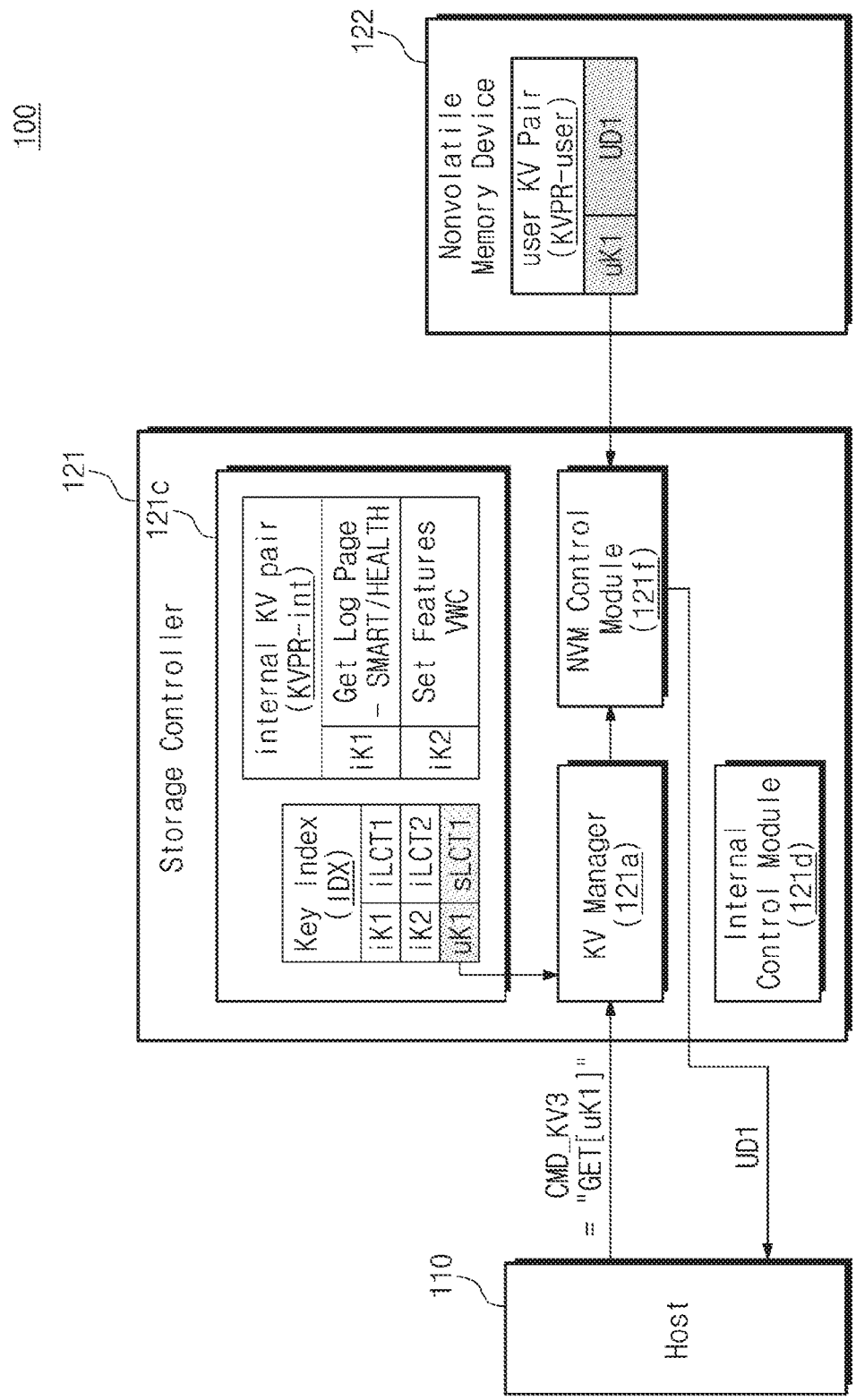

Then, a configuration that performs a read operation on the first user data UD1 is described with reference to FIG. 9C. As illustrated in FIG. 9C, the host 110 may transmit a third KV command CMD_KV3 to the storage controller 121 for the purpose of performing a read operation on the first user data UD1. The third KV command CMD_KV3 may have a command structure or a command format of GET[uK1].

The KV manager 121a of the storage controller 121 may check that the first user key uK1 of the third KV command CMD_KV3 is a user key, based on the key index IDX (e.g., based on a key group identifier). The KV manager 121a may check the first storage location sLCT1 corresponding to the first user key uK1, based on the key index IDX. The KV manager 121a may control the NVM control module 121f, based on the first storage location sLCT1.

The NVM control module 121f may read a value (i.e., the first user data UD1) corresponding to the first user key uK1 from the user KV pair KVPR-user of the nonvolatile memory device 122 based on the first storage location sLCT1 and may transmit the read value (i.e., the first user data UD1) to the host 110.

Figure 9D:
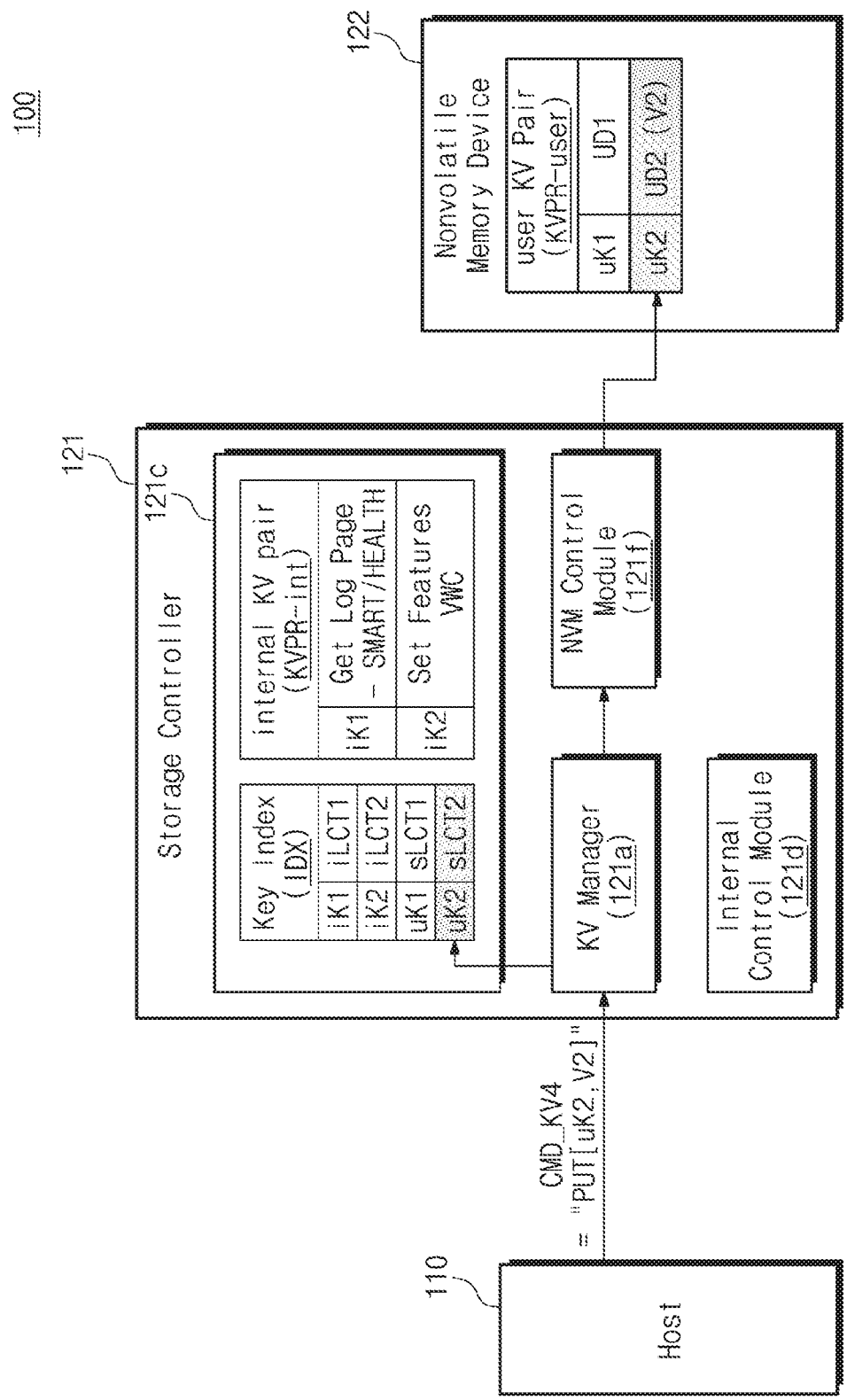

Then, a configuration that performs a write operation on the second user data UD2 is described with reference to FIG. 9D. As illustrated in FIG. 9D, the host 110 may transmit a fourth KV command CMD_KV4 to the storage controller 121 for the purpose of performing a write operation on the second user data UD2. The fourth KV command CMD_KV4 may have a command structure or a command format of PUT[uK2, V2].

The KV manager 121a of the storage controller 121 may check that the second user key uK2 of the fourth KV command CMD_KV4 is a user key, based on the key index IDX (e.g., based on a key group identifier). The KV manager 121a may determine or allocate a storage location (e.g., the second storage location sLCT2), at which a second value V2 of the fourth KV command CMD_KV4 is to be stored, based on the key index IDX. The KV manager 121a may control the NVM control module 121f, based on the allocated storage location sLCT2.

Under control of the KV manager 121a, the NVM control module 121f may store the second value V2 as the second user data UD2 in an area of the user KV pair KVPR-user of the nonvolatile memory device 122, which corresponds to the allocated storage location sLCT2. In other words, the NVM control module 121f may store the second value V2 corresponding to the second user key uK2 in the user KV pair KVPR-user as the second user data UD2.

In an exemplary embodiment, after the write operation is completed or while the write operation is performed, the KV manager 121a may update the key index IDX based on the allocated storage location sLCT2 and the second user key uK2. That is, the updated key index IDX may include information about the second user key uK2 and information about the allocated storage location sLCT2.

Figure 9E:
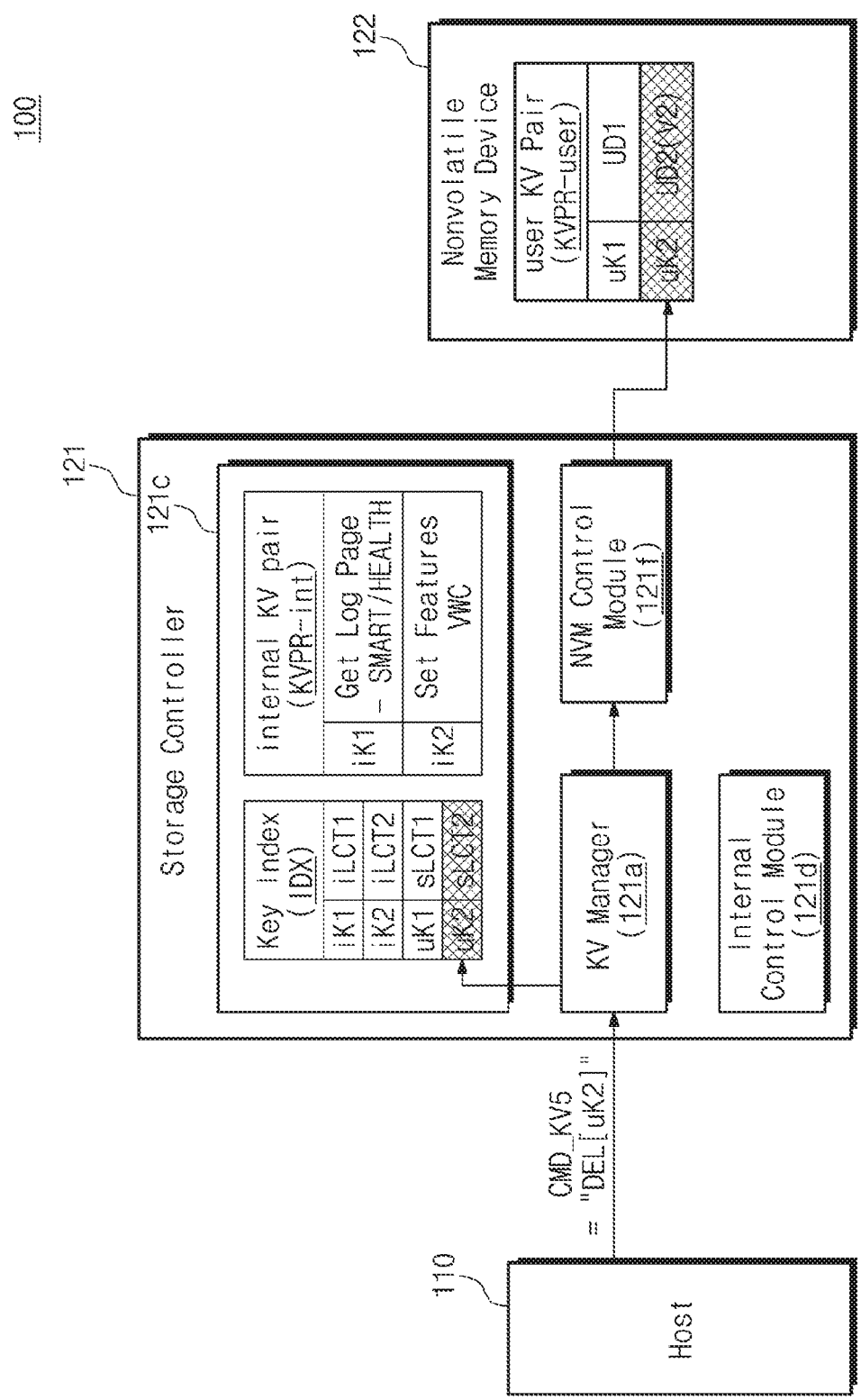

Then, a configuration that performs a delete operation on the second user data UD2 is described with reference to FIG. 9E. As illustrated in FIG. 9E, the host 110 may transmit a fifth KV command CMD_KV5 to the storage controller 121 for the purpose of performing a delete operation on the second user data UD2. The fifth KV command CMD_KV5 may have a command structure or a command format of DEL[uK2].

The KV manager 121a of the storage controller 121 may check that the second user key uK2 of the fifth KV command CMD_KV5 is a user key, based on the key index IDX (e.g., based on a key group identifier). The KV manager 121a may check the second storage location sLCT2 corresponding to the second user key uK2, based on the key index IDX. The KV manager 121a may control the NVM control module 121f, based on the second storage location sLCT2.

Under control of the KV manager 121a, the NVM control module 121f may delete the second user data UD2 corresponding to the second user key uK2 from the user KV pair KVPR-user. In an exemplary embodiment, the NVM control module 121f may physically delete the second user data UD2 under control of the KV manager 121a. Alternatively, under control of the KV manager 121a, the NVM control module 121f may logically erase the second user data UD2 (e.g., invalidate the second user data UD2), and afterwards, the NVM control module 121f may physically delete the second user data UD2 under a specific condition (e.g., garbage collection).

The KV manager 121a may update the key index IDX after the second user data UD2 are physically or logically deleted. That is, the updated key index IDX may not include information about the second user key uK2 corresponding to the second user data UD2. Alternatively, the updated key index IDX may include invalidation information about the second user key uK2.

As described above, the storage system 100 according to an embodiment of the disclosure may perform various input/output operations and various admin operations, based on KV commands. For example, as described with reference to FIGS. 9A and 9C, the first admin operation and the read operation may be performed by using KV commands of the same type, that is, the GET command. In this case, even though KV commands for the first admin operation and the read operation are of the same type, the first admin operation and the read operation may be performed by changing a key included in the KV command. Alternatively, as described with reference to FIGS. 9B and 9D, the second admin operation and the write operation may be performed by using KV commands of the same type, that is, the PUT command. In this case, even though KV commands for the second admin operation and the write operation are of the same type, the second admin operation and the write operation may be performed by changing a key included in the KV command In other words, the KV command for the read operation or the write operation may be used for any other admin operations.

In an exemplary embodiment, that KV commands are of the same type may mean that values of specific fields of the KV commands are identical. For example, that KV commands are of the same type may mean that fields of operation codes OpCode of the KV commands are identical. Alternatively, that KV commands are of the same type may mean that headers of the KV commands are identical. However, the disclosure is not limited thereto.

That is, according to an embodiment of the disclosure, various operations of the storage device may be supported in a state where the number of command formats or command types defined between a host and a storage device is minimized.

Figure 10:
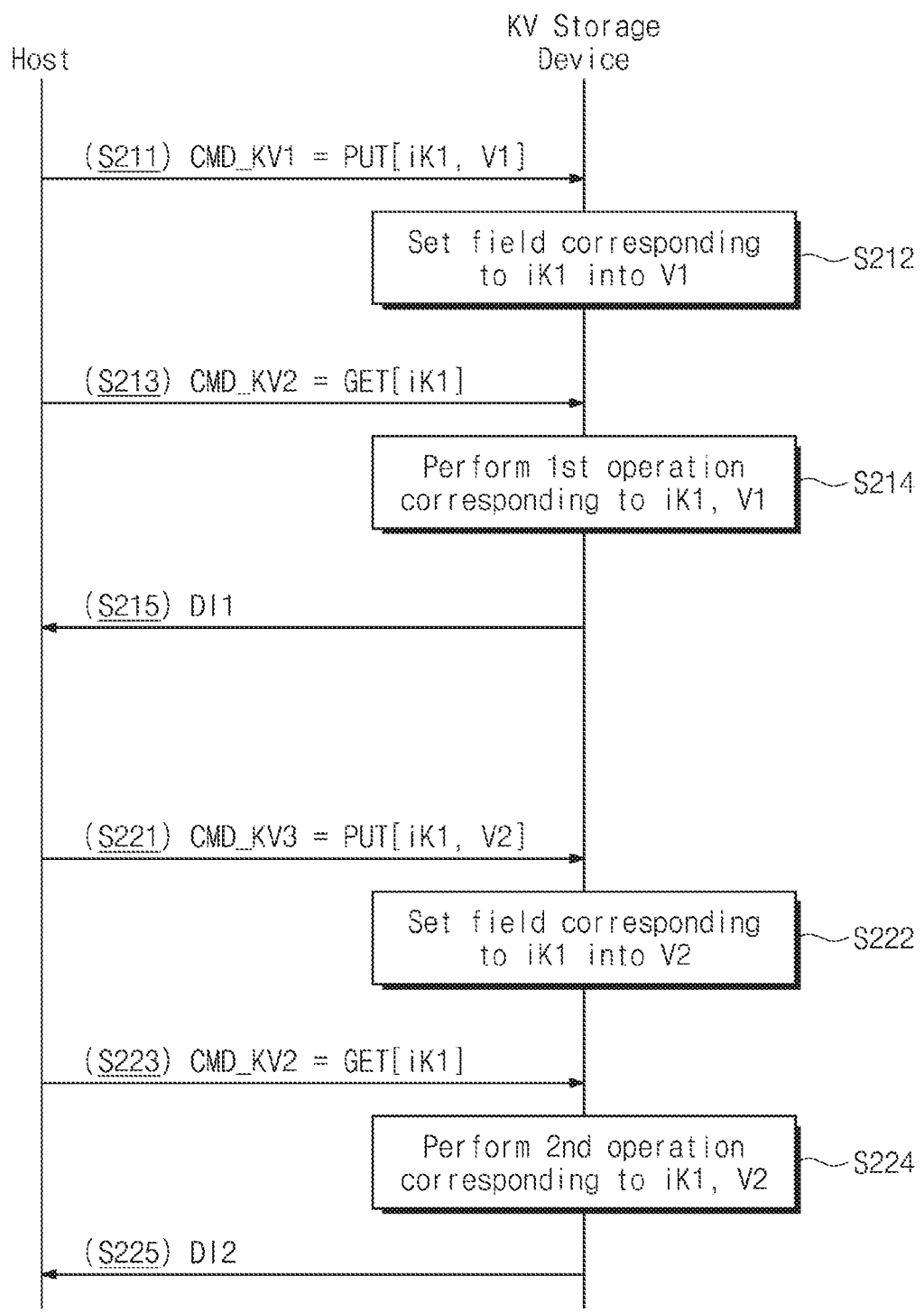
FIG. 10 is a flowchart illustrating an operation of a storage system of FIG. 1.

FIG. 10 is a flowchart illustrating an operation of a storage system of FIG. 1. A configuration in which the host 110 updates the internal KV pair KVPR-int and performs an admin operation based on the updated internal KV pair KVPR-int is described with reference to FIG. 10. Below, for convenience of description, the detailed description of redundant components is omitted.

Referring to FIGS. 1 and 10, in operation S211, the host 110 may transmit a first KV command CMD_KV1 to the storage device 120. In this case, the first KV command CMD_KV1 may have a command structure or a command format of PUT[iK1, V1].

In operation S212, the storage device 120 may set a field corresponding to the first internal key iK1 to a first value V1. For example, the storage device 120 may set or update a field of the internal KV pair KVPR-int, which corresponds to the first internal key iK1, to the first value V1.

In operation S213, the host 110 may transmit a second KV command CMD_KV2 to the storage device 120. The second KV command CMD_KV2 may have a command structure or a command format of GET[iK1].

In operation S214, the storage device 120 may perform a first operation corresponding to the first internal key iK1 and the first value V1. For example, a field of the internal KV pair KVPR-int, which corresponds to the first internal key iK1, is set to the first value V1 through operation S211 and operation S212. That is, in the case where the second KV command CMD_KV2 having a structure of GET[iK1] is received through operation S213, the storage device 120 may perform an operation corresponding to the first internal key iK1 and the first value V1. Operation S214 will be more fully described with reference to FIGS. 11A to 11E.

In operation S215, the storage device 120 may transmit first device information DI1 to the host 110 as a result of the first operation. For example, in the case where information corresponding to the first internal key iK1 corresponds to a Get Log Page command and the first value V1 corresponds to SMART/HEALTH information, the first device information DI1 may be SMART/HEALTH information. Operation S215 will be more fully described with reference to FIGS. 11A to 11E.

Afterwards, the host 110 and the storage device 120 may perform operation S221 to operation S225. Operation S221 to operation S225 are similar to operation S211 to operation S215 except that a value is a second value V2 and device information is second device information DI2, and thus, additional description will be omitted to avoid redundancy.

As described above, the host 110 may set a field corresponding to a specific internal key to a value corresponding to a specific admin operation by using a KV command of a PUT type and may then perform a specific admin operation by using a KV command of a GET type including the specific internal key. That is, the internal KV pair KVPR-int may be updated by the host 110, and the host 110 may perform various admin operations based on the updated internal KV pair.

Figure 11A:
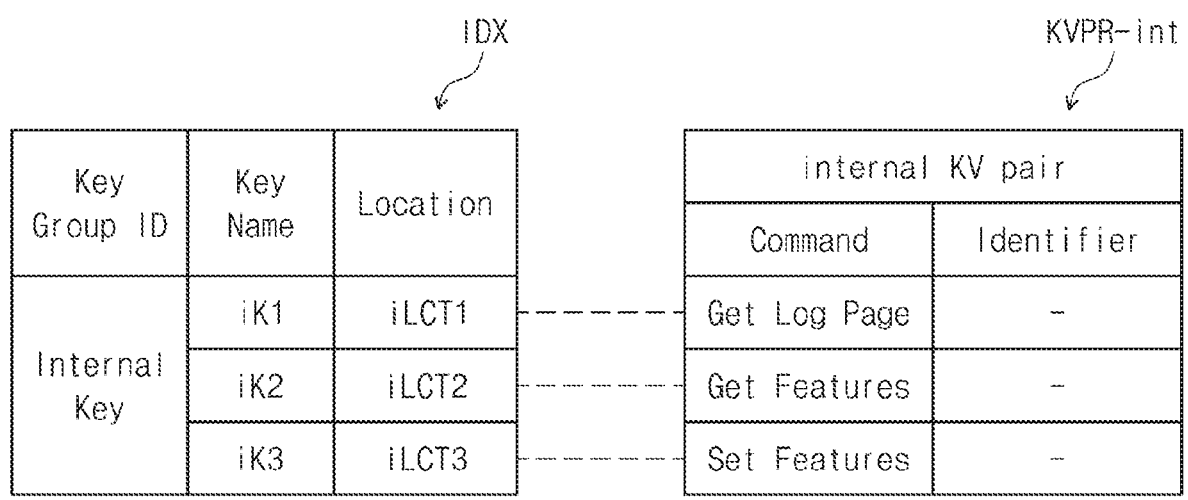
FIGS. 11A to 11E are diagrams for describing an operation according to the flowchart of FIG. 10.

FIGS. 11A to 11E are diagrams for describing an operation according to the flowchart of FIG. 10. For convenience of description, the detailed description of redundant components is omitted. First, referring to FIGS. 1 and 11A, the key index IDX may include information about the internal keys iK1 to iK3 and information about the internal locations iLCT1 to iLCT3. The internal KV pair KVPR-int may include values associated with the internal keys iK1 to iK3. In this case, unlike the description given with reference to FIG. 5, at least one of fields (e.g., an identifier) in each of values included in the internal KV pair KVPR-int of FIG. 11A may not be defined. That is, a value corresponding to the first internal key iK1 may include information corresponding to a Get Log Page command but may not include information about an identifier. Likewise, a value corresponding to the second internal key iK2 may include information corresponding to a Get Features command but may not include information about an identifier; a value corresponding to the third internal key iK3 may include information corresponding to a Set Features command but may not include information about an identifier. However, the key index IDX and the internal KV pair KVPR-int illustrated in FIG. 11A are exemplary, and the disclosure is not limited thereto. For example, the internal KV pair KVPR-int may further include, as a value, various commands or command types supporting a variety of different admin operations.

In an exemplary embodiment, as described with reference to FIG. 10, the host 110 may update the internal KV pair KVPR-int by setting specific fields (e.g., an identifier) of the internal KV pair KVPR-int by using a KV command of a PUT type. The host 110 may perform an admin operation based on the updated internal KV pair KVPR-int.

Referring to FIGS. 1 and 10 to 11E, the storage device 120 may include the storage controller 121 and the nonvolatile memory device 122. The storage controller 121 may include the KV manager 121a, the memory device 121c, the internal control module 121d, and the NVM control module 121f. The memory device 121c may include the key index IDX and the internal KV pair KVPR-int. For convenience of description, it is assumed that the internal KV pair KVPR-int includes information about a Get Log Page command and a Get Features command as values corresponding to the first and second internal keys iK1 and iK2.

Figure 11B:
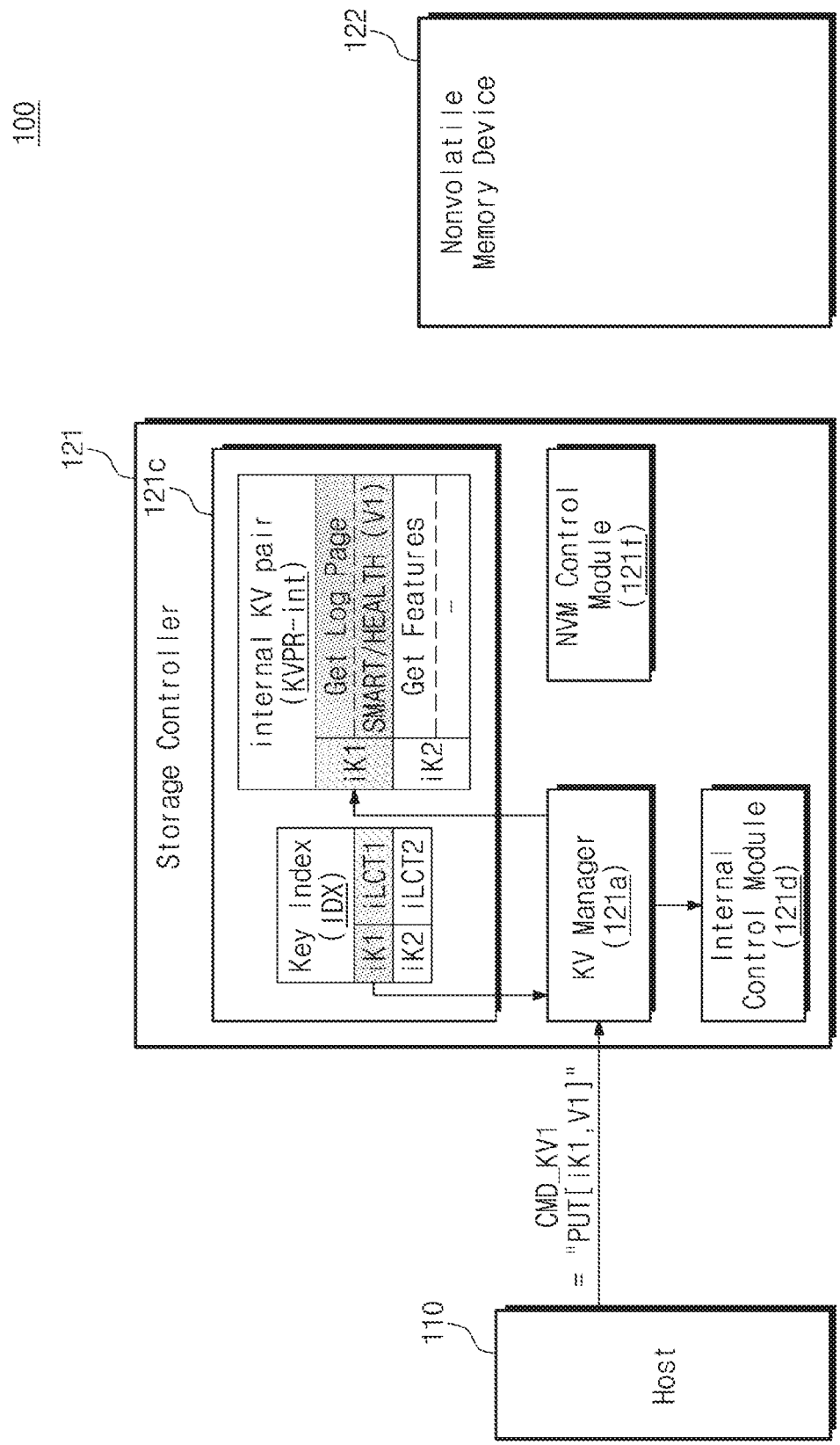

How to obtain SMART/HEALTH information by using the first internal key iK1 will be described with reference to FIGS. 11B and 11C. As illustrated in FIG. 11B, the host 110 may transmit the first KV command CMD_KV1 to the storage controller 121. The first KV command CMD_KV1 may have a command structure or a command format of PUT[iK1, V1].

The KV manager 121a may check that the first internal key iK1 of the first KV command CMD_KV1 is an internal key, based on the key index IDX. The KV manager 121a may check the first internal location iLCT1, at which a value corresponding to the first internal key iK1 is stored, based on the key index IDX. The KV manager 121a may set a specific field (e.g., an identifier) to the first value V1, at the first internal location iLCT1. In this case, the first value V1 may indicate an identifier corresponding to SMART/HEALTH information.

Figure 11C:
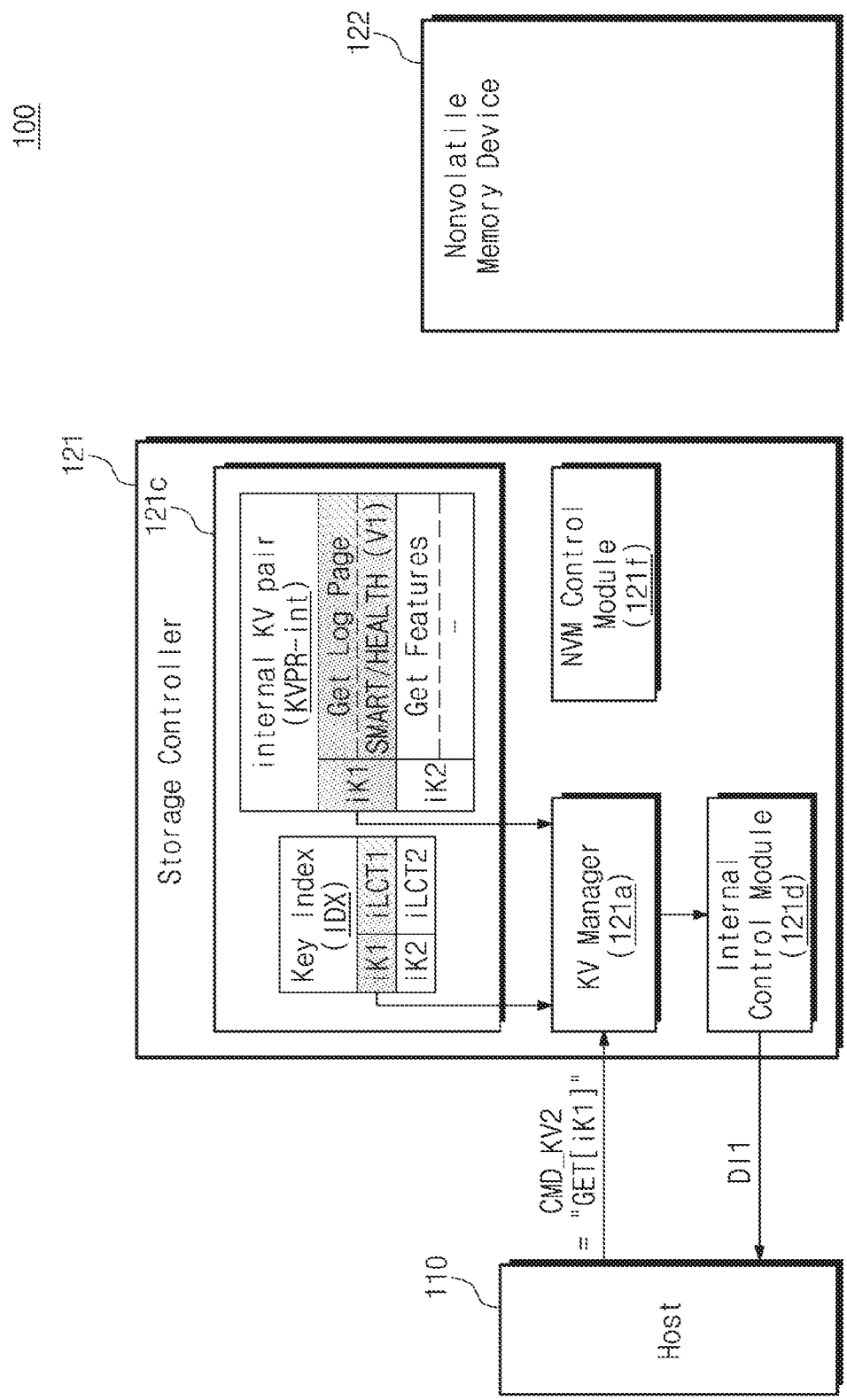

Afterwards, as illustrated in FIG. 11C, the host 110 may transmit the second KV command CMD_KV2 to the storage controller 121. The second KV command CMD_KV2 may have a command structure or a command format of GET [iK1]. The KV manager 121a may control the internal control module 121d, based on a value (e.g., Get Log Page—SMART/HEALTH) corresponding to the first internal key iK1, in response to the second KV command CMD_KV2, and the internal control module 121d may output the first device information DI1. The operation of FIG. 11C is similar to the operation of FIG. 9A except that a specific field corresponding to the first internal key iK1 is additionally set, and thus, additional description will be omitted to avoid redundancy.

Figure 11D:
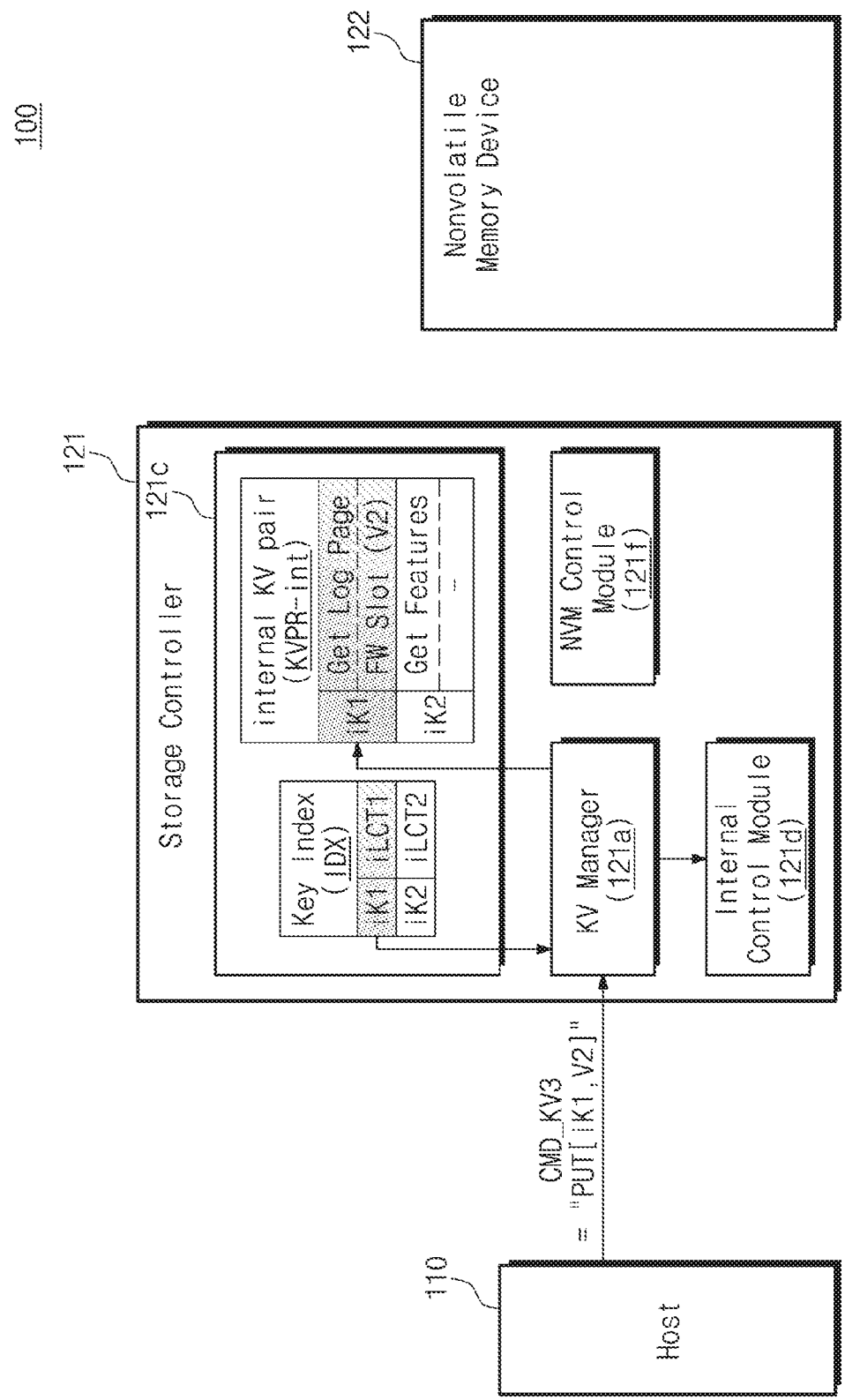

Next, how to obtain F/W Slot information by using the first internal key iK1 will be described with reference to FIGS. 11D and 11E. As illustrated in FIG. 11D, the host 110 may transmit the third KV command CMD_KV3 to the storage controller 121. The third KV command CMD_KV3 may have a command structure or a command format of PUT[iK1, V2].

The KV manager 121a may check that the first internal key iK1 of the third KV command CMD_KV3 is an internal key, based on the key index IDX. The KV manager 121a may check the first internal location iLCT1, at which a value corresponding to the first internal key iK1 is stored, based on the key index IDX. The KV manager 121a may set a specific field (e.g., an identifier) to the second value V2, at the first internal location iLCT1. In this case, the second value V2 may indicate an identifier corresponding to F/W Slot information.

Figure 11E:
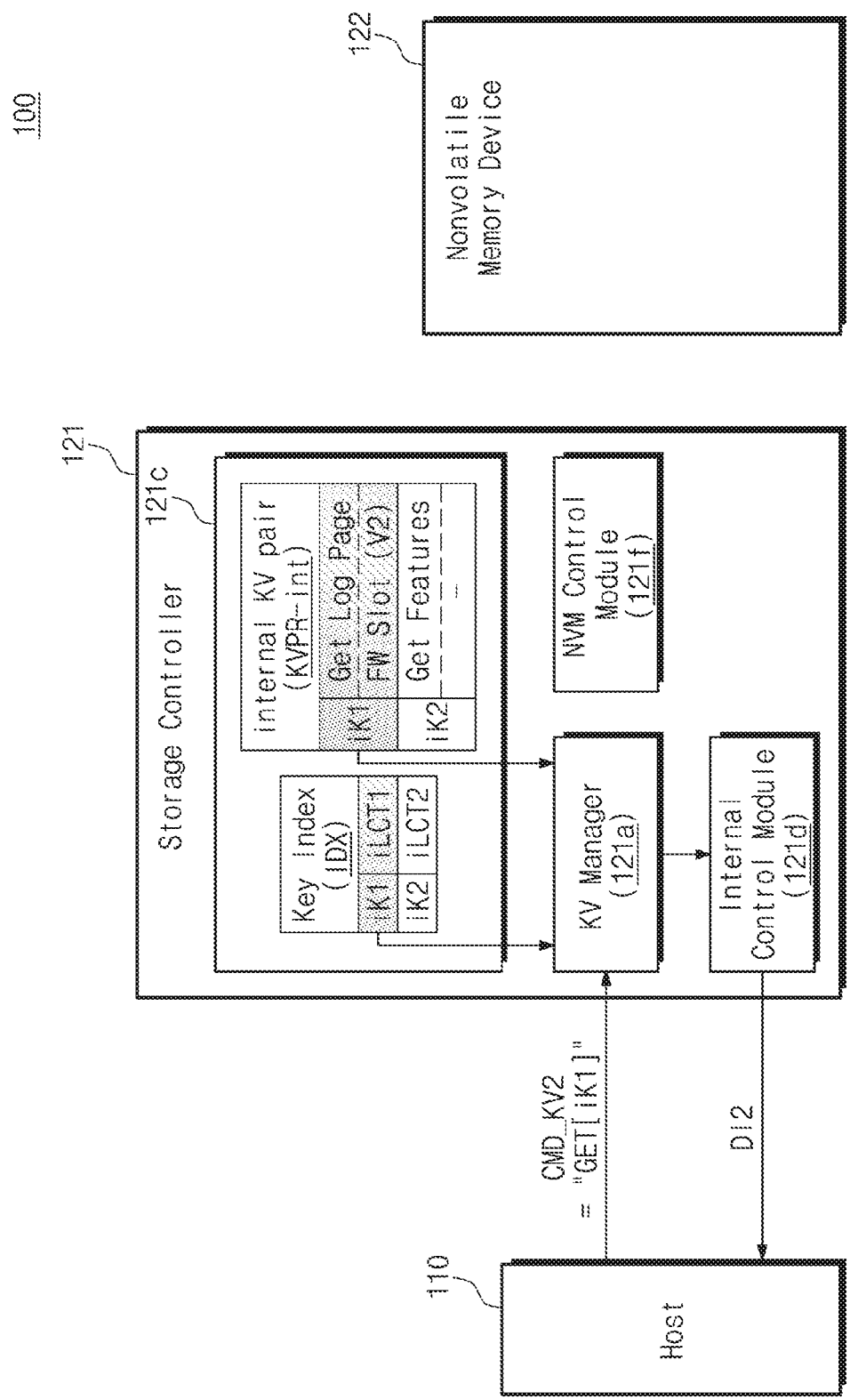

Afterwards, as illustrated in FIG. 11E, the host 110 may transmit the second KV command CMD_KV2 to the storage controller 121. The second KV command CMD_KV2 may have a command structure or a command format of GET [iK1]. The KV manager 121a may control the internal control module 121d, based on a value (e.g., Get Log Page—F/W Slot) corresponding to the first internal key iK1, in response to the second KV command CMD_KV2, and the internal control module 121d may output the second device information DI2.

As described above, depending on a value previously set to a specific internal key, different admin operations may be performed by using the same KV command (e.g., GET [iK1]). That is, the host 110 may update the internal KV pair KVPR-int by using a KV command of a PUT type and may perform various admin operations by using the updated internal KV pair. Accordingly, because it is unnecessary to define a separate command for each of various admin operations, an interface between the host 110 and the storage device 120 may be simplified. Accordingly, a storage system having improved performance and reduced costs is provided.

Figure 12:
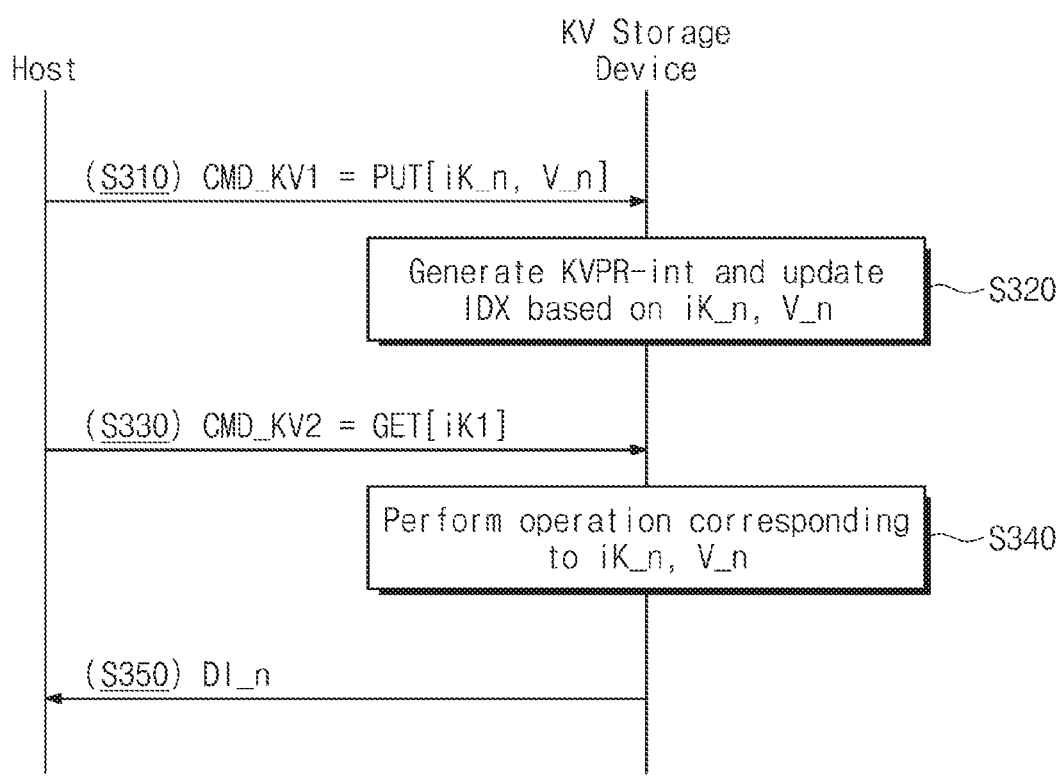
FIG. 12 is a flowchart illustrating an operation of a storage system of FIG. 1.

FIG. 12 is a flowchart illustrating an operation of a storage system of FIG. 1. For convenience of description, the detailed description of redundant components is omitted. Referring to FIGS. 1 and 12, in operation S310, the host 110 may transmit the first KV command CMD_KV1 to the storage device 120. The first KV command CMD_KV1 may have a command structure or a command format of PUT [iK_n, V_n]. In this case, "iK_n" may indicate information about a new internal key, and "V_n" may indicate a value corresponding to a new internal key.

That is, to perform an admin operation that is not defined by the internal KV pair KVPR-int of the storage device 120, the host 110 may transmit the first KV command CMD_KV1 including the new internal key iK_n and the corresponding value V_n to the storage device 120.

In operation S320, the storage device 120 may update the internal KV pair KVPR-int and the key index IDX, based on the new internal key iK_n and the corresponding value V_n, in response to the first KV command CMD_KV1. For example, the storage controller 121 may determine a new internal location iLCT_n associated with the new internal key iK_n and may store the value V_n corresponding to the new internal location iLCT_n. The storage controller 121 may register or update the new internal location iLCT_n and the new internal key iK_n at the key index IDX.

In operation S330, the host 110 may transmit the second KV command CMD_KV2 to the storage device 120. The second KV command CMD_KV2 may have a command structure or a command format of GET [iK_n].

In operation S340, the storage device 120 may perform an operation corresponding to the new internal key iK_n and the corresponding value V_n, in response to the second KV command CMD_KV2. In operation S350, the storage device 120 may transmit device information DI_n to the host 110 as a result of operation S340. Operation S340 and operation S350 are similar to the above description except that the internal key iK_n and the value V_n are newly defined by the host 110, and thus, additional description will be omitted to avoid redundancy.

Figure 13:
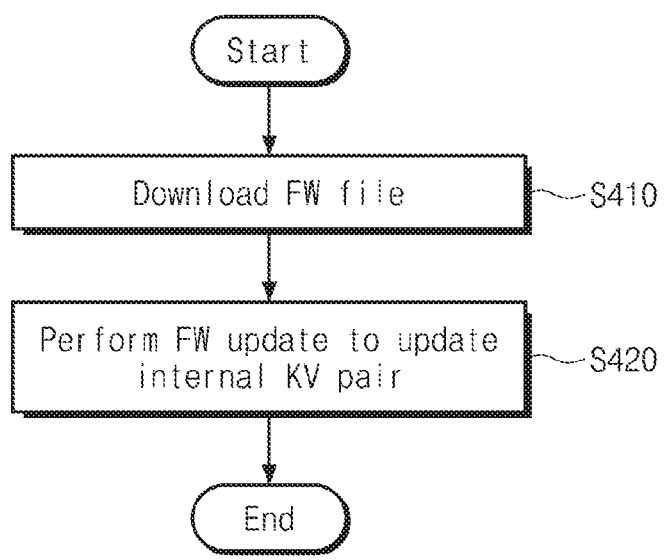
FIG. 13 is a flowchart illustrating an operation of a storage device of FIG. 1.

FIG. 13 is a flowchart illustrating an operation of a storage device of FIG. 1. Referring to FIGS. 1 and 13, in operation S410, the storage device 120 may download a firmware file. For example, the storage device 120 may download a firmware file provided from a manufacturer over a network connected with the host 110. Alternatively, the storage device 120 may download the firmware file over a separate communication channel.

In operation S420, the storage device 120 may perform a firmware update based on the firmware file to update the internal KV pair KVPR-int. For example, as described above, the internal KV pair KVPR-int may be managed within the storage device 120 and may be given information. That is, the internal KV pair KVPR-int may be provided in the form of firmware. In the case where a new admin function is added to the storage device 120, the internal KV pair KVPR-int may be updated through the firmware update provided by the manufacturer.

In an exemplary embodiment, a current communication channel that supports a specific interface protocol may fail to meet a new interface protocol to which a new function is added. In contrast, according to the above embodiment of the disclosure, even though a function between the host 110 and the storage device 120 is newly added, the newly added function may be supported by performing the firmware update on the internal KV pair KVPR-int. Accordingly, a storage system having reduced costs is provided.

Figure 14:
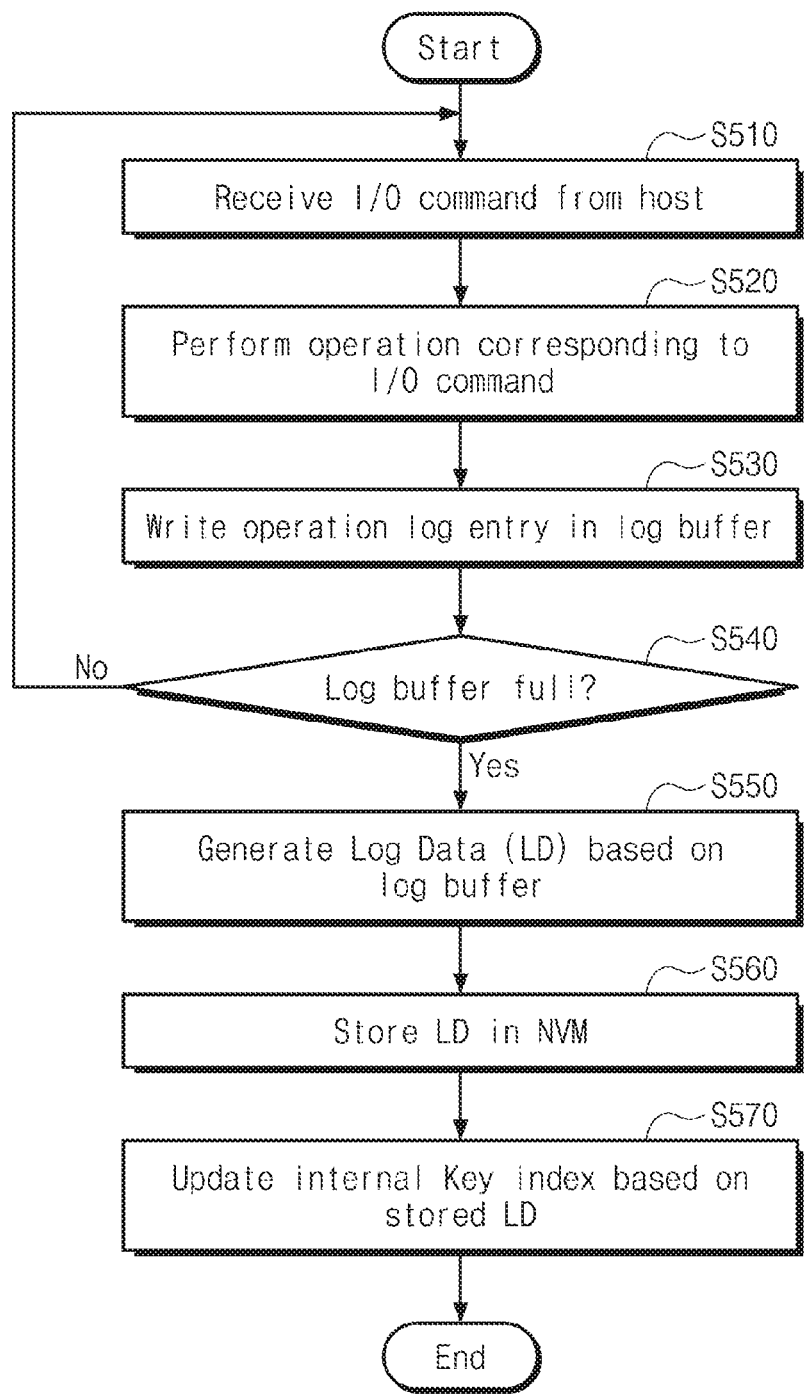
FIG. 14 is a flowchart illustrating an operation of a storage device of FIG. 1.

FIG. 14 is a flowchart illustrating an operation of a storage device of FIG. 1. A configuration that manages an operation log by using a key-value pair at the storage device 120 is described with reference to FIG. 14. For brief description, the detailed description of redundant components is omitted.

Referring to FIGS. 1 and 14, in operation S510, the storage device 120 may receive an input/output command from the host 110. In an exemplary embodiment, the input/output command may be the KV command CMD_KV associated with the user key uK. That is, the input/output command may have a data structure or a command format of GET[uK], PUT[uK, V], DEL[uK], etc.

In operation S520, the storage device 120 may perform an operation corresponding to the input/output command. For example, in the case where the input/output command is a KV command of GET[uK], the storage device 120 may transmit user data corresponding to the user key uK to the host 110. Alternatively, in the case where the input/output command is a KV command of PUT[uK, V], the storage device 120 may store a value "V" in the user KV pair KVPR-user of the nonvolatile memory device 122 and may update the key index IDX. Alternatively, in the case where the input/output command is a KV command of DEL[uK], the storage device 120 may delete or remove a value or user data corresponding to the user key uK from the user KV pair KVPR-user.

In operation S530, the storage device 120 may write an operation log entry in a log buffer. For example, the operation log entry may indicate information or rough information about the operation performed in operation S520. The storage device 120 may write an operation log entry corresponding to the performed operation in a log buffer being a partial area of the memory device 121c (refer to FIG. 2) or a separate log buffer.

In operation S540, the storage device 120 may determine whether the log buffer is full. For example, the storage device 120 may determine whether a log buffer allocated in advance is completely filled with operation log entries. In an exemplary embodiment, the storage device 120 may determine whether a total size of operation logs written in the log buffer is a reference value or greater.

When the log buffer is not completely filled with operation log entries, that is, when a free space is present in the log buffer, the storage device 120 continues to perform operation S510.

When the log buffer is completely filled with operation log entries, that is, when a free space is absent from the log buffer, in operation S550, the storage device 120 may generate log data LD based on the log entries stored in the log buffer. For example, the log data LD may be a combination of a plurality of log entries stored in the log buffer.

In operation S560, the storage device 120 may store the generated log data LD in the nonvolatile memory device 122. In an exemplary embodiment, the log data LD may be stored in an operation log KV pair KVPR-op (to be described with reference to FIG. 15E) of the nonvolatile memory device 122. In an exemplary embodiment, after the log data LD is stored in the nonvolatile memory device 122, the log buffer may be reset or released.

In operation S570, the storage device 120 may update the key index IDX based on the stored log data LD. For example, the storage device 120 may allocate an operation log key ok to the log data LD and may update the key index IDX based on the allocated operation log key ok and a storage location where log data are stored.

That is, as described above, the storage device 120 according to an embodiment of the disclosure may manage an operation log associated with an internally performed operation by using a KV pair, without a separate explicit command or request from the host 110. In an exemplary embodiment, information about an operation log key may be provided to the host 110 through a KV command of a LIST type from the host 110. The host 110 may read the log data LD from the storage device 120 by using a KV command (e.g., a KV command of a GET[oK] type), based on information about an operation log key.

FIGS. 15A to 15E are diagrams for describing an operation according to the flowchart of FIG. 14. For convenience of description, the detailed description of redundant components is omitted. Components that are unnecessary to describe a way to manage an operation log by using a KV pair depending on the flowchart of FIG. 14 are omitted. However, the disclosure is not limited thereto. For example, the storage system 100 to be described with reference to FIGS. 15A to 15E may be configured to perform the operation method (the admin operation using an internal key) described with reference to FIGS. 1 to 13.

Referring to FIGS. 1, 14, and FIGS. 15A to 15E, the storage system 100 may include the host 110 and the storage device 120. The storage device 120 may include the storage controller 121 and the nonvolatile memory device 122. The storage controller 121 may include the KV manager 121a, the memory device 121c, and the NVM control module 121f. The memory device 121c may include the key index IDX and a log buffer LB. The nonvolatile memory device 122 may include the user key-value (KV) pair KVPR-user. In an exemplary embodiment, the log buffer LB may indicate a portion, which is allocated to write an operation log, of a space of the memory device 121c. In an exemplary embodiment, the log buffer LB may be implemented with a separate memory.

Figure 15A:
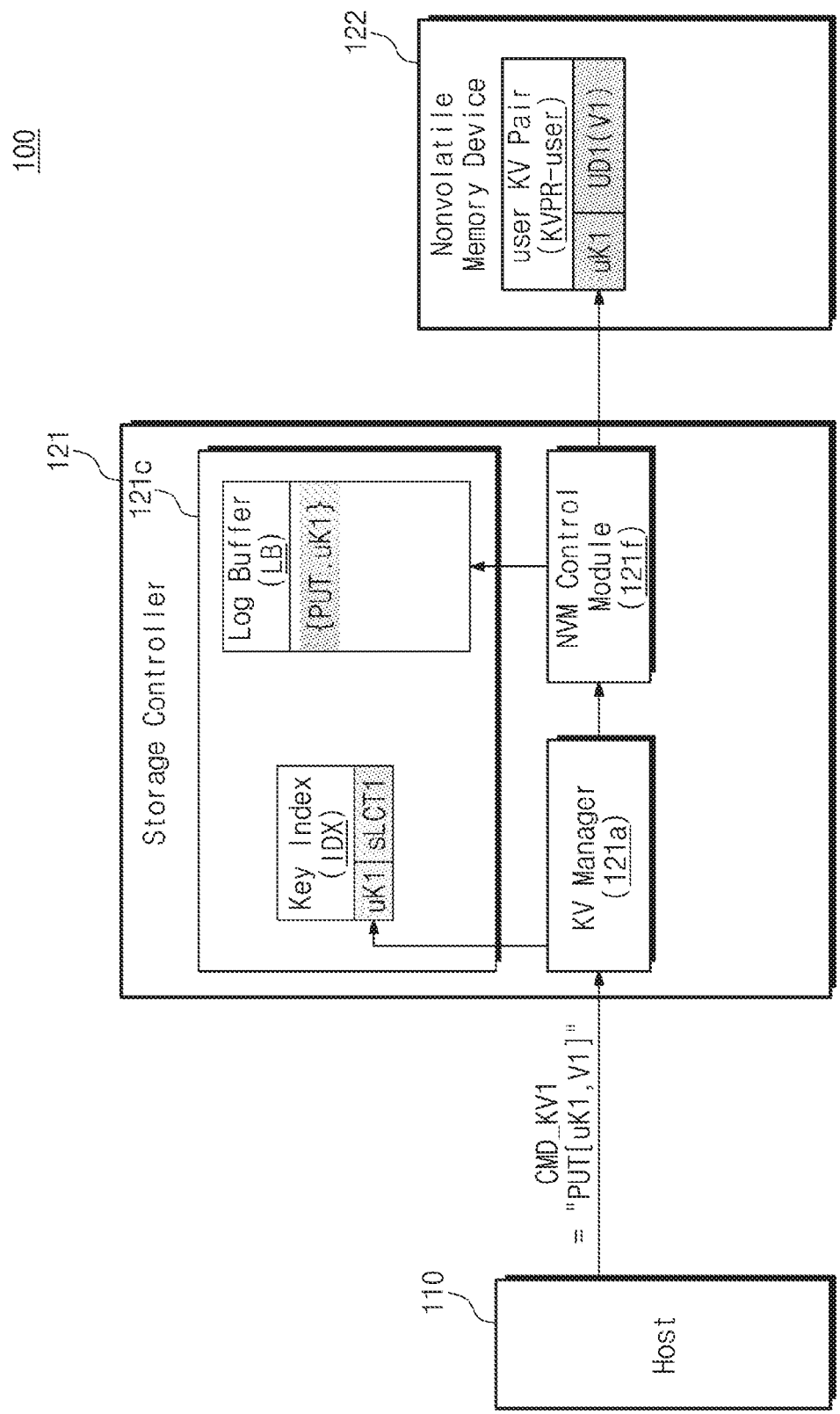
FIGS. 15A to 15E are diagrams for describing an operation according to the flowchart of FIG. 14.

As illustrated in FIG. 15A, the host 110 may transmit the first KV command CMD_KV1 having a structure of PUT[uK1, V1] to the storage controller 121. The KV manager 121a may control the NVM control module 121f, based on the first KV command CMD_KV1. The NVM control module 121f may store the first value V1 corresponding to the first user key uK1 in the user KV pair KVPR-user as the first user data UD1. The KV manager 121a may update the key index IDX based on the first storage location sLCT1 where the first value V1 corresponding to the first user key uK1 is stored.

The NVM control module 121f may write information {PUT.uK1} about an operation (i.e., an operation of storing the first value V1 corresponding to the first user key uK1) corresponding to the first KV command CMD_KV1 in the log buffer LB.

Figure 15B:
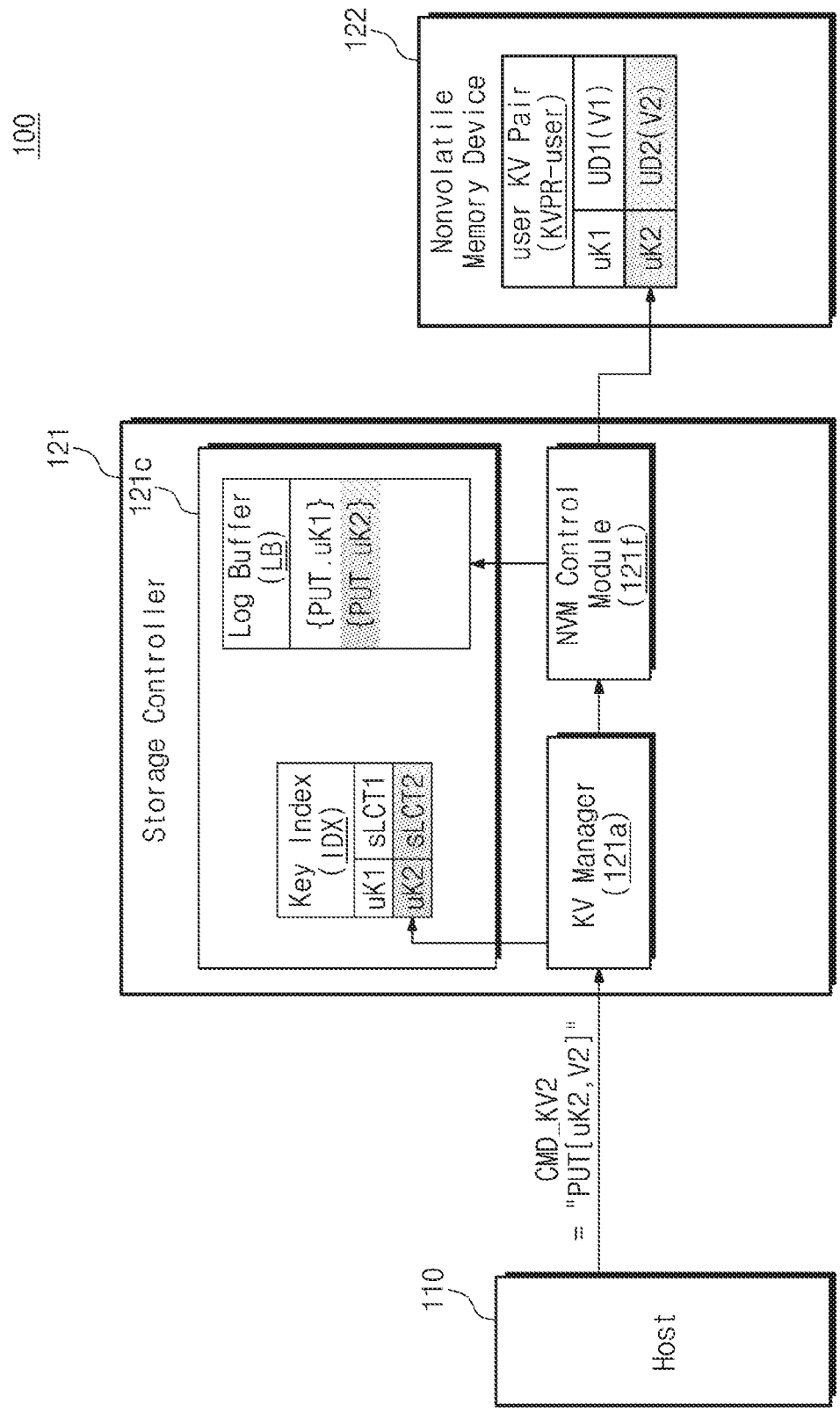

Next, as illustrated in FIG. 15B, the host 110 may transmit the second KV command CMD_KV2 having a structure of PUT[uK2, V2] to the storage controller 121. As in the above description, the NVM control module 121f may store the second value V2 corresponding to the second user key uK2 in the user KV pair KVPR-user as the second user data UD2 and may write information {PUT.uK2} about an operation corresponding to the second KV command CMD_KV2 in the log buffer LB. The KV manager 121a may update the key index IDX based on the second storage location sLCT2 where the second value V2 is stored and the second user key uK2.

Figure 15C:
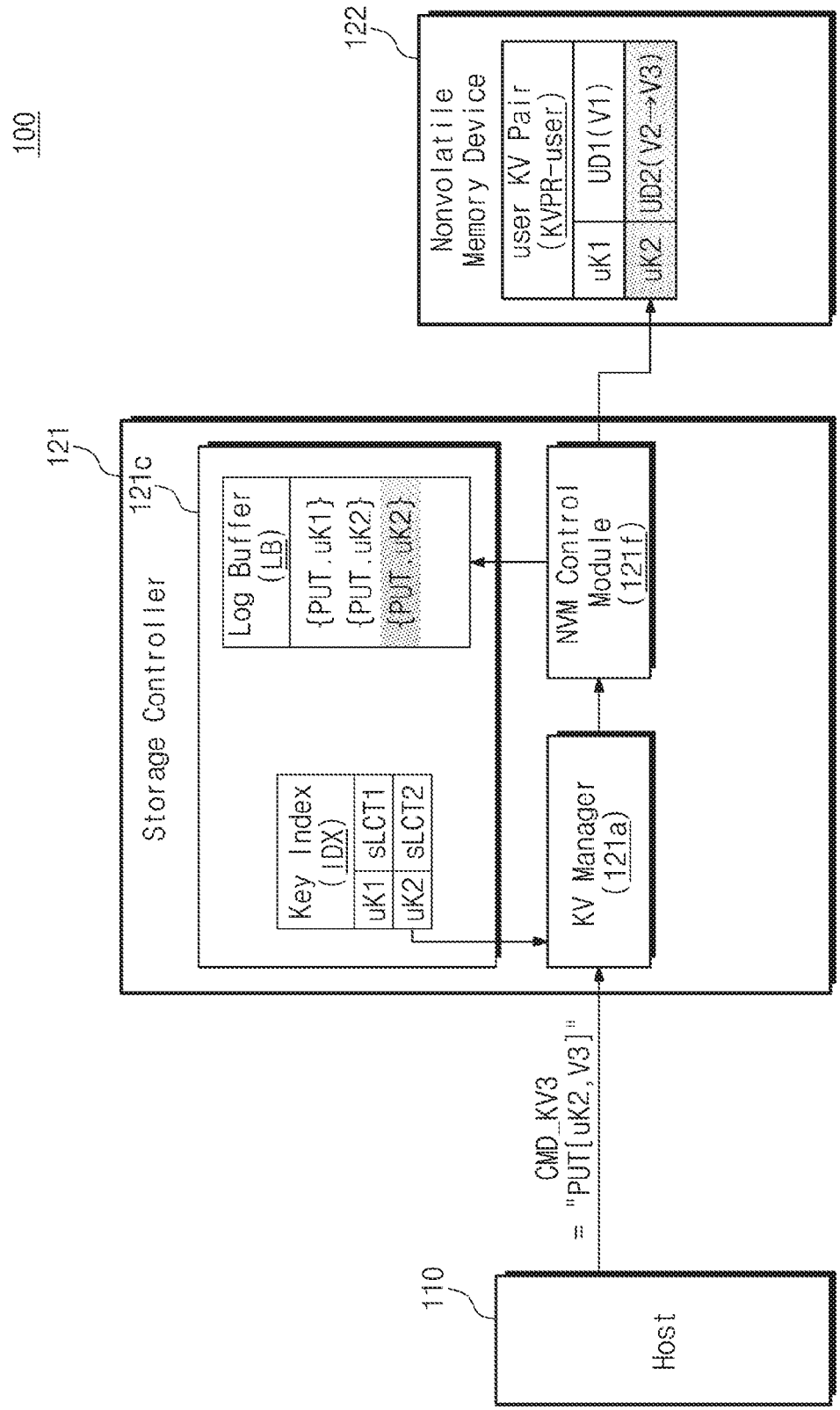

Then, as illustrated in FIG. 15C, the host 110 may transmit the third KV command CMD_KV3 having a structure of PUT[uK2, V3] to the storage controller 121. The KV manager 121a may check that the second user data UD2 corresponding to the second user key uK2 are present in the user KV pair KVPR-user, based on the key index IDX. In this case, under control of the KV manager 121a, the NVM control module 121f may replace or update the second user data UD2 of the user KV pair KVPR-user from the second value V2 to the third value V3.

The NVM control module 121f may write information {PUT.uK2} about an operation corresponding to the third KV command CMD_KV3 in the log buffer LB. Because the information about the second user key uK2 is included in the key index IDX, the KV manager 121a may not update the key index IDX.

Figure 15D:
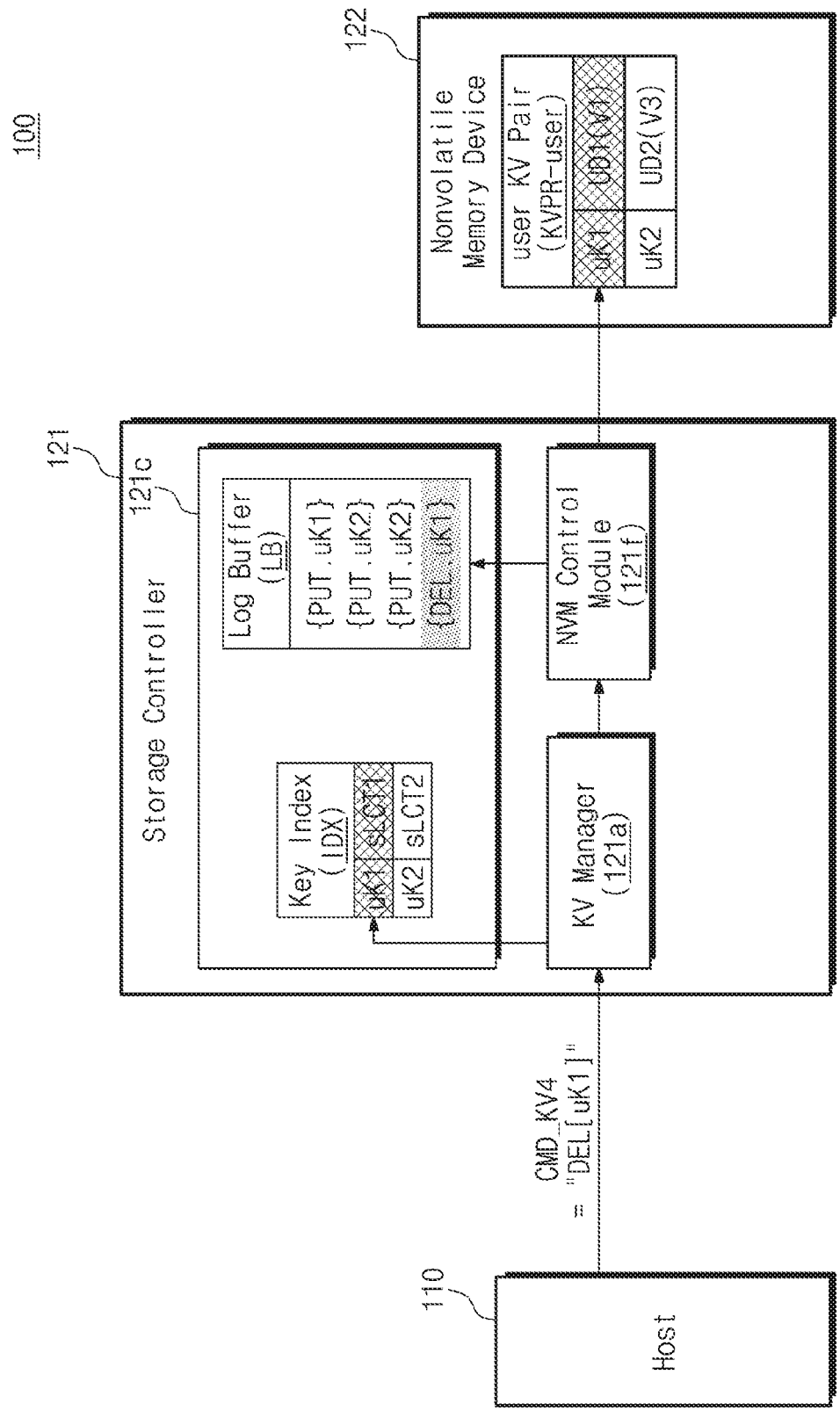

Then, as illustrated in FIG. 15D, the host 110 may transmit the fourth KV command CMD_KV4 having a structure of DEL[uK1] to the storage controller 121. The KV manager 121a may check the first storage location sLCT1, at which a value (i.e., the first user data UD1) corresponding to the first user key uK1 of the fourth KV command CMD_KV4 is stored, based on the key index IDX and may control the NVM control module 121f based on the first storage location sLCT1.

The NVM control module 121f may remove, invalidate, or delete the first user data UD1 corresponding to the first user key uK1 from the user KV pair KVPR-user under control of the KV manager 121a. The NVM control module 121f may write information {DEL.uK1} about the operation corresponding to the fourth KV command CMD_KV4 in the log buffer LB.

Figure 15E:
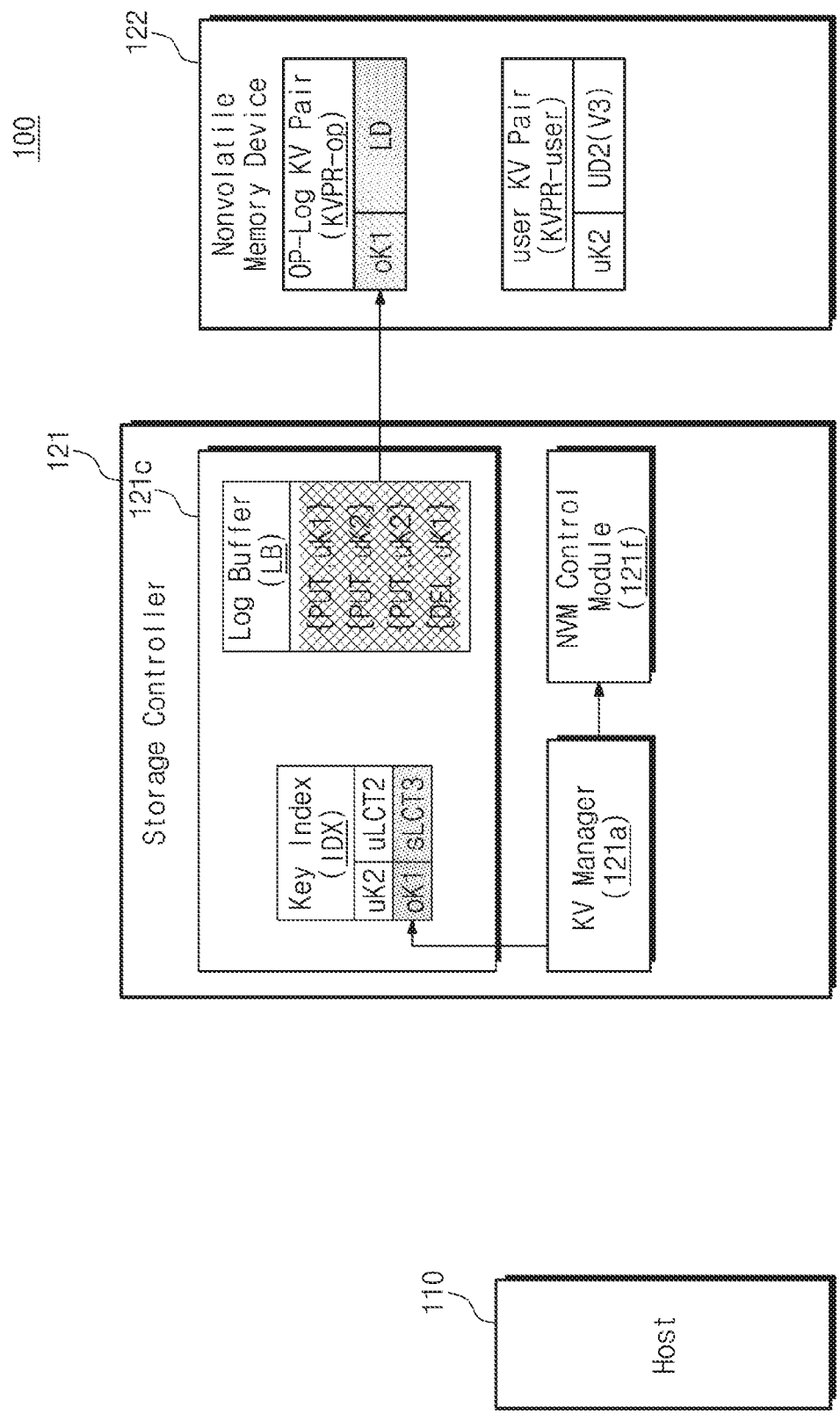

As illustrated in FIG. 15E, the log buffer LB may be full. In this case, the storage controller 121 may generate the log data LD based on log entries "{PUT.uK1}, {PUT.uK2}, {PUT.uK2}, and {DEL.uK1}" stored in the log buffer LB and may store the generated log data LD in the operation log KV pair KVPR-op of the nonvolatile memory device 122.

The KV manager 121a may allocate a first operation log key ok1 to the log data LD. The KV manager 121a may update the key index IDX based on the first operation log key ok1 and a storage location sLCT3 where the log data LD corresponding to the first operation log key oK1 is stored. That is, the updated key index IDX may include information about the first operation log key oK1 and the third storage location sLCT3.

In an exemplary embodiment, the first operation log key ok1 may be managed as an internal key, and a key group identifier corresponding to an internal key may be allocated to the first operation log key ok1.

In an exemplary embodiment, after the embodiment of FIG. 15E, in the case where a KV command of GET[oK1] is received from the host 110, the storage controller 121 may provide the log data LD corresponding to the first operation log key ok1 from the operation log KV pair KVPR-op to the host 110. The host 110 may use the log data LD included in the operation log KV pair KVPR-op for journaling.

In an exemplary embodiment, in the case where a free space present in the storage device 120 is insufficient (i.e., in the case where a space for the user KV pair KVPR-user is insufficient), the host 110 may secure a storage space (i.e., a space for the user KV pair KVPR-user) of the storage device 120 by deleting the log data LD included in the operation log KV pair KVPR-op by using a KV command of a DEL type.

As described above, according to an embodiment of the disclosure, the storage device 120 may manage an operation log associated with an internally performed operation by using a KV pair, without a separate explicit command or request from the host 110. Accordingly, because separate commands for managing an operation log are not required, an interface of a storage system may be simplified.

Figure 16:
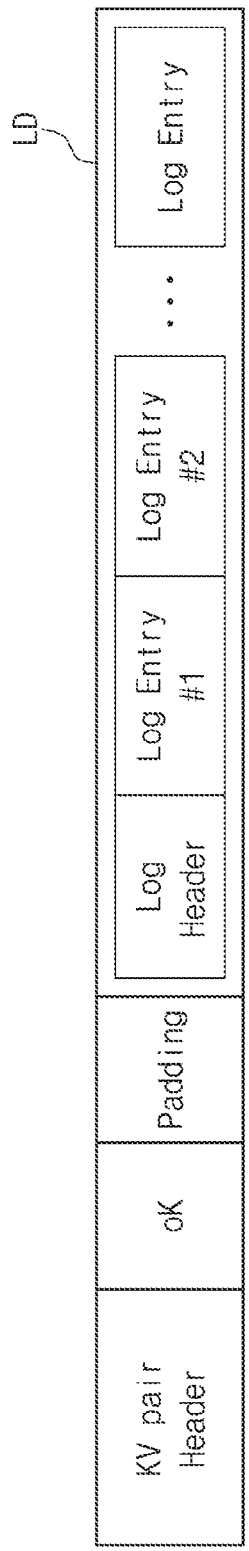
FIG. 16 is a diagram illustrating an internal data structure used to store log data of FIG. 15E.

FIG. 16 is a diagram illustrating an internal data structure used to store log data of FIG. 15E. Referring to FIG. 16, a data structure may include a KV pair header, an operation log key ok, padding information, and the log data LD (i.e., a value).

The KV pair header may include information (e.g., a PUT command header) necessary to store the log data LD in the operation log KV pair KVPR-op. The operation log key ok may include information about an operation log key. The padding information may be any value for adjusting a size of the data structure.

The log data LD may include a log header and a plurality of log entries. The log header and the plurality of log entries may include information of Table 2 below.

TABLE 2

| Type | Field | Size (in byte) |
| --- | --- | --- |
| Log Header | Signature | 2 |
| | Log Header Sequence Number | 8 |
| | Key OP Log Count | 4 |
| | Size | 4 |
| Log Entry | Operation Type | 2 |
| | Key Group ID | 2 |
| | Key Size | 4 |
| | Reserved | 8 |
| | Key | Variable (4~255 B) |

Referring to Table 2 above, the log header may include a signature of 2 bytes, a log header sequence number of 8 bytes, a key operation log count of 4 bytes, and size information of 4 types. Each of the plurality of log entries may include 2-byte operation type information, 2-byte key group identifier information, 4-bype key size information, 8-bype reserved information, and size-variable key information of the corresponding KV command. The log data LD including a plurality of operation log entries may be stored in the operation log KV pair KVPR-op of the nonvolatile memory device 122 based on the data structure illustrated in FIG. 16.

Figure 17:
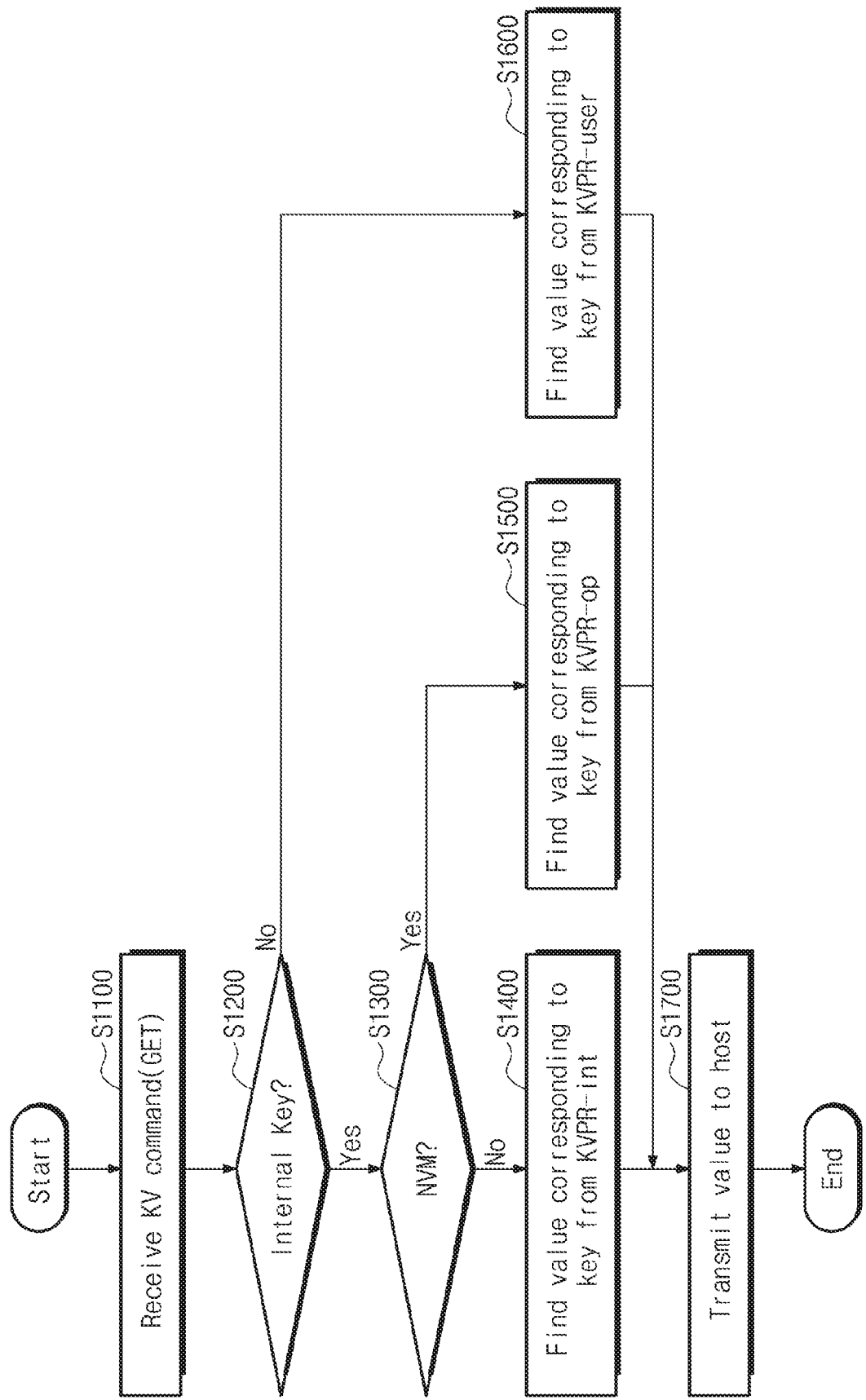
FIG. 17 is a flowchart illustrating an operation of a storage device of FIG. 1.

FIG. 17 is a flowchart illustrating an operation of a storage device of FIG. 1. An embodiment in which the storage device 120 manages the internal KV pair KVPR-int and the operation log KV pair KVPR-op is described with reference to FIG. 17. For a brief description, it is assumed that a KV command received from the host 110 is a GET command including a first key.

Referring to FIGS. 1, 15E, and 17, in operation S1100, the storage device 120 may receive a KV command from the host 110. In this case, the KV command may be the GET command including the first key.

In operation S1200, the storage device 120 may determine whether the first key is an internal key. For example, the storage controller 121 may determine whether the first key is an internal key or a user key, based on a key group identifier included in the first key.

When the first key is an internal key, in operation S1300, the storage device 120 may determine whether a value corresponding to the first key is stored in the nonvolatile memory device 122. For example, the storage device 120 may check a location where the first key is stored, based on the key index IDX. In an exemplary embodiment, when the first key corresponds to information of the internal KV pair KVPR-int, the value corresponding to the first key may be stored in the memory device 121*c* of the storage controller 121; when the first key corresponds to information of the operation log KV pair KVPR-op, the value corresponding to the first key may be stored in the nonvolatile memory device 122.

When the value corresponding to the first key is absent from the nonvolatile memory device 122, in operation S1400, the storage device 120 may find the corresponding value from the internal KV pair KVPR-int. For example, as described above, in the case where the first key corresponds to Get Log Page—SMART/HEALTH information of the internal KV pair KVPR-int, the storage device 120 may find or generate SMART/HEALTH information as the corresponding value. That is, the corresponding value may be determined by performing an operation corresponding to the value of the first key.

When the value corresponding to the first key is present in the nonvolatile memory device 122, in operation S1500, the storage device 120 may find a value (i.e., log data) corresponding to the first key from the operation log KV pair KVPR-op.

When the first key is not an internal key (i.e., in the case where the first key is a user key), in operation S1600, the storage device 120 may find user data corresponding to the first key from the user KV pair KVPR-user of the nonvolatile memory device 122 as a value.

In operation S1700, the storage device 120 may transmit the found or generated value to the host 110.

As described above, the storage system 100 according to an embodiment of the disclosure may support a way to extract or read information of various types (e.g., user data, an operation log, or information about various admin operations) by using a single type of KV command (e.g., a GET command) Accordingly, an interface of the storage system 100 may be simplified, and a new function may be easily added/changed/deleted without a separate interface change. Accordingly, a storage system having improved performance and reduced costs is provided.

Figure 18:
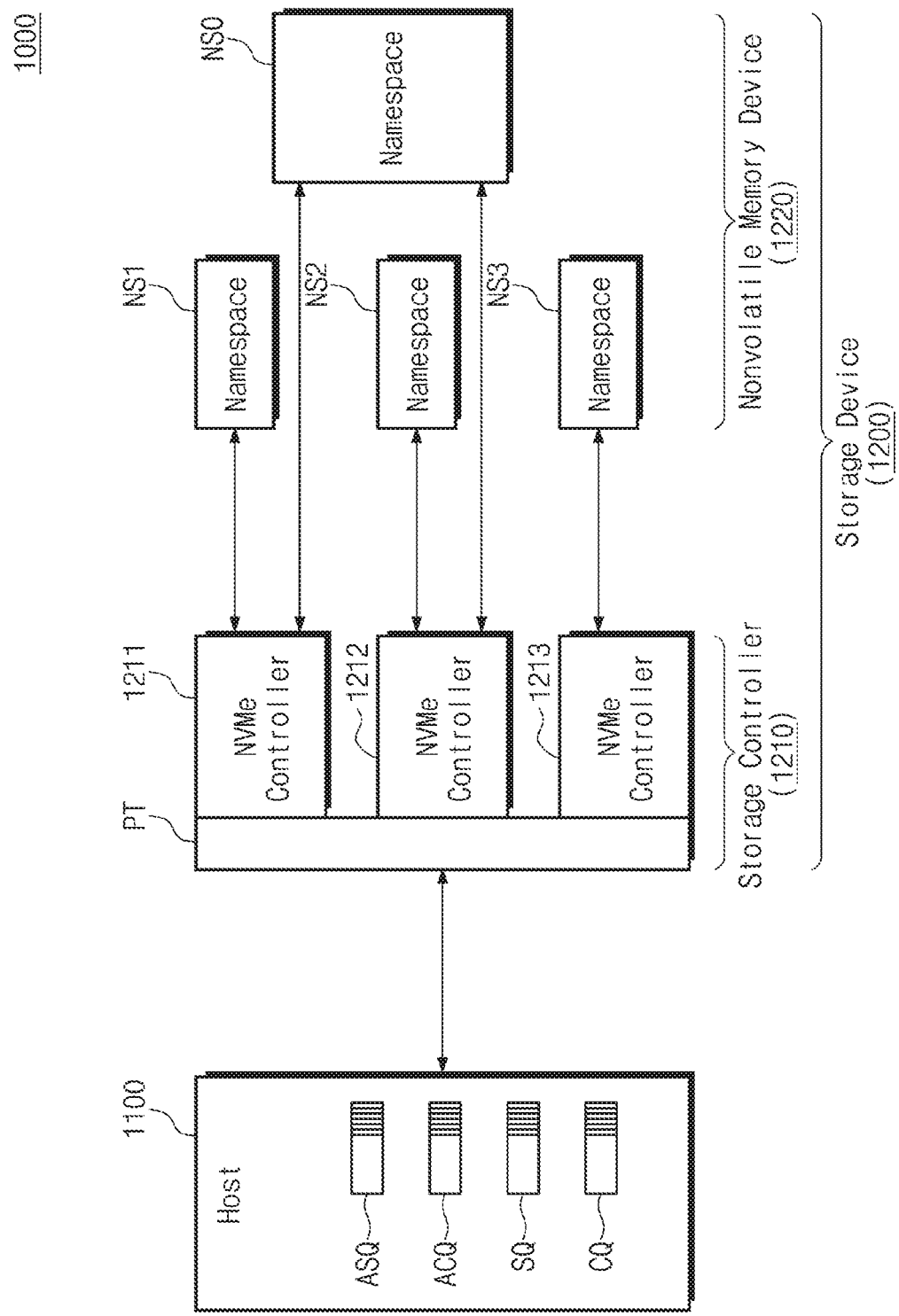
FIG. 18 is a block diagram illustrating a storage system according to an embodiment of the disclosure.

FIG. 18 is a block diagram illustrating a storage system according to an embodiment of the disclosure. Referring to FIG. 18, a storage system 1000 may include a host 1100 and a storage device 1200. The host 1100 may be configured to control the storage device 1200.

The storage device 1200 may include a storage controller 1210 and a nonvolatile memory device 1220. The storage controller 1210 may include a plurality of NVMe controllers 1211 to 1213. Each of the plurality of NVMe controllers 1211 to 1213 may communicate with the host 1100 through a physical port PT. In an exemplary embodiment, the plurality of NVMe controllers 1211 to 1213 may communicate with the host 1100 through different physical ports (not illustrated). The physical port PT may indicate a physical layer defined by the PCIe interface protocol.

The plurality of NVMe controllers 1211 to 1213 may be configured to control namespaces NS0 to NS3 of the nonvolatile memory device 1220 respectively under control of the host 1100. For example, the nonvolatile memory device 1220 may be divided into a plurality of namespaces NS0 to NS3. Each of the plurality of namespaces NS0 to NS3 may be a storage space that is logically or physically divided. Each of the plurality of namespaces NS0 to NS3 may be configured to have independent attributes under control of the host 1100.

The first NVMe controller 1211 may control the 0-th and first namespaces NS0 and NS1, the second NVMe controller 1212 may control the 0-th and second namespaces NS0 and NS2, and the third NVMe controller 1213 may control the third namespace NS3. That is, the 0-th namespace NS0 may be a namespace that is shared by each of the first and second NVMe controllers 1211 and 1212.

In an exemplary embodiment, the host 1100 may control the storage device 1200 through an admin submission queue ASQ, an admin completion queue ACQ, a submission queue SQ, and a completion queue CQ. The admin submission queue ASQ may be configured to queue an admin command to be provided to at least one of the plurality of NVMe controllers 1211 to 1213. The admin completion queue ACQ may be configured to queue completion information about an admin command. The submission queue SQ may be configured to queue an input/output command to be provided to at least one of the plurality of NVMe controllers 1211 to 1213. The completion queue CQ may be configured to queue completion information about an input/output command.

The admin submission queue ASQ, the admin completion queue ACQ, the submission queue SQ, and the completion queue CQ may be provided for each of the plurality of NVMe controllers 1211 to 1213, may be shared by the plurality of NVMe controllers 1211 to 1213, may be provided for each of the plurality of namespaces NS0 to NS3, or may be shared by the plurality of namespaces NS0 to NS3.

In an exemplary embodiment, at least one namespace of the plurality of namespaces NS0 to NS3 may be used as key-value storage. For example, attributes of the first namespace NS1 of the plurality of namespaces NS0 to NS3 may be set to key-value storage. In this case, the first NVMe controller 1211 configured to control the first namespace NS1 may operate based on the operation method described with reference to FIGS. 1 to 17. That is, the first NVMe controller 1211 may perform the operation described with reference to FIGS. 1 to 17 in response to the KV command CMD_KV from the host 1100. In this case, the internal KV pair KVPR-int may be managed by the first NVMe controller 1211.

In an exemplary embodiment, in the case where the first NVMe controller 1211 operates based on the operation method described with reference to FIGS. 1 to 17, the host 1100 may queue a command (i.e., a KV command including an internal key) for an admin operation associated with the first namespace NS1 in the admin submission queue ASQ or in the submission queue SQ, not the admin submission queue ASQ.

As described above, the storage system 1000 according to an embodiment of the disclosure may manage a storage space of the nonvolatile memory device 1220 with a plurality of namespaces and may manage at least a part of the plurality of namespaces based on the operation method (i.e., an admin operation using an internal KV pair) described with reference to FIGS. 1 to 18.

Figure 19:
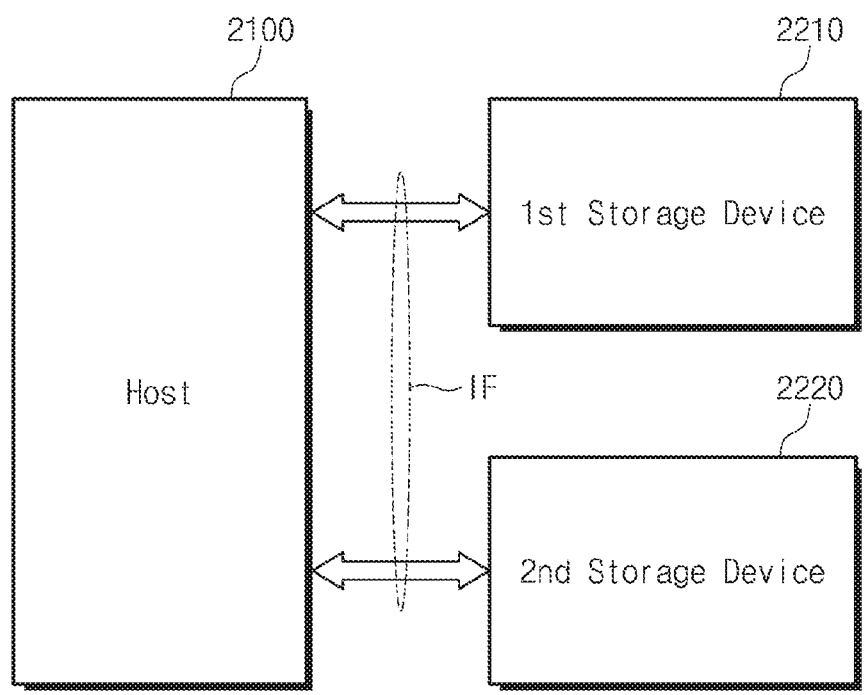
FIG. 19 is a block diagram illustrating a storage system according to an embodiment of the disclosure.

FIG. 19 is a block diagram illustrating a storage system according to an embodiment of the disclosure. Referring to FIG. 19, a storage system 2000 may include a host 2100 and first and second storage devices 2210 and 2220. The host 2100 may communicate with the first and second storage devices 2210 and 2220 through an interface channel IF. In an exemplary embodiment, the interface channel IF may be a communication channel configured to support the KV command described with reference to FIGS. 1 to 18.

Each of the first and second storage devices 2210 and 2220 may be the storage device described with reference to FIGS. 1 to 18. That is, each of the first and second storage devices 2210 and 2220 may be configured to manage the internal KV pair KVPR-int or the operation log KV pair KVPR-op. In an exemplary embodiment, the internal KV pair KVPR-int that is managed by the first device 2210 may be different from the internal KV pair KVPR-int that is managed by the second device 2220. That is, admin operations that are supported by the first and second storage devices 2210 and 2220 may be different. However, according to an embodiment of the disclosure, because various admin operations are performed by using a KV command of the same type, even though admin operations supported by the first and second storage devices 2210 and 2220 are different, the host 2100 may normally perform the admin operations that are supported by the first and second storage devices 2210 and 2220.

Figure 20:
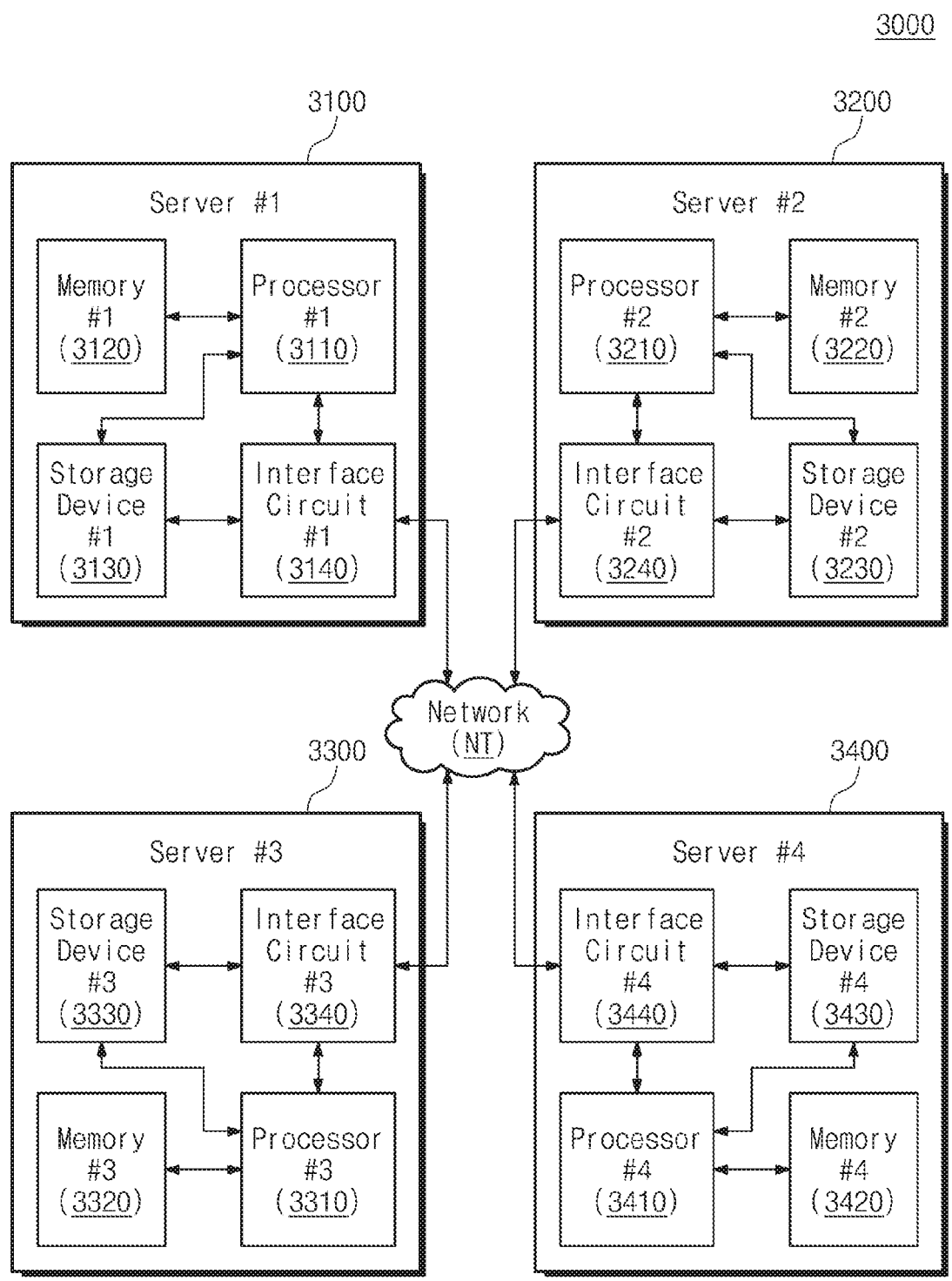
FIG. 20 is a block diagram illustrating a data center to which a storage system according to an embodiment of the disclosure is applied.

FIG. 20 is a block diagram illustrating a data center to which a storage system according to an embodiment of the disclosure is applied. Referring to FIG. 20, a data center 3000 may include a plurality of computing nodes 3100 to 3400 (or servers). The plurality of computing nodes 3100 to 3400 may communicate with each other over a network NT. In an exemplary embodiment, the network NT may be a storage dedicated network such as a storage area network (SAN) or may be an Internet network such as TCP/IP. In an exemplary embodiment, the network NT may include at least one of various communication protocols such as Fibre channel, iSCSI protocol, FCoE, NAS, and NVMe-oF.

The plurality of computing nodes 3100 to 3400 may include processors 3110, 3210, 3310, and 3410, memories 3120, 3220, 3320, and 3420, storage devices 3130, 3230, 3330, and 3430, and interface circuits 3140, 3240, 3340, and 3440.

For example, the first computing node 3100 may include the first processor 3110, the first memory 3120, the first storage device 3130, and the first interface circuit 3140. In an exemplary embodiment, the first processor 3110 may be implemented with a single core or a multi-core. The first memory 3120 may include a memory such as a DRAM, an SDRAM, an SRAM, a 3D XPoint memory, an MRAM, a PRAM, an FeRAM, or an ReRAM. The first memory 3120 may be used as a system memory, a working memory, or a buffer memory of the first computing node 3100. The first storage device 3130 may be a high-capacity storage medium such as a hard disk drive (HDD) or a solid state drive (SSD). The first interface circuit 3140 may be a network interface controller (NIC) configured to support communication over the network NT.

In an exemplary embodiment, the first processor 3110 of the first computing node 3100 may be configured to access the first memory 3120 based on a given memory interface. Alternatively, in an embodiment of a shared memory architecture, the first processor 3110 of the first computing node 3100 may be configured to access the memories 3220, 3320, and 3420 of the remaining computing nodes 3200, 3300, and 3400 over the network NT. The interface circuit 3140 may include a network switch (not illustrated) configured to control or support an access of the first processor 3110 to a shared memory (i.e., memories of any other computing nodes).

In an exemplary embodiment, the first processor 3110 of the first computing node 3100 may be configured to access the first storage device 3130 based on a given storage interface. Alternatively, the first processor 3110 of the first computing node 3100 may be configured to access the storage devices 3230, 3330, and 3430 of the remaining computing nodes 3200, 3300, and 3400 over the network NT. The interface circuit 3140 may include a network switch (not illustrated) configured to control or support an access of the first processor 3110 to storage devices of any other computing nodes. In an exemplary embodiment, the storage devices 3130 to 3430 respectively included in the plurality of computing nodes 3100 to 3400 may constitute one RAID volume.

Operations of the second to fourth computing nodes 3200 to 3400 may be similar to the operation of the first computing node 3100 described above, and thus, additional description will be omitted to avoid redundancy.

In an exemplary embodiment, various applications may be executed at the data center 3000. The applications may be configured to execute an instruction for data movement or copy between the computing nodes 3100 to 3400 or may be configured to execute instructions for combining, processing, or reproducing a variety of information present on the computing nodes 3100 to 3400. In an exemplary embodiment, the applications may be executed by one of the plurality of computing nodes 3100 to 3400 included in the data center 3000, or the applications may be distributed and executed between the plurality of computing nodes 3100 to 3400.

In an exemplary embodiment, the data center 3000 may be used for high-performance computing (HPC) (e.g., finance, petroleum, materials science, meteorological prediction), an enterprise application (e.g., scale out database), a big data application (e.g., NoSQL database or in-memory replication).

In an exemplary embodiment, at least one of the plurality of computing nodes 3100 to 3400 may be an application server. The application server may be configured to execute an application configured to perform various operations at the data center 3000. At least one of the plurality of computing nodes 3100 to 3400 may be a storage server. The storage server may be configured to store data that are generated or managed at the data center 3000.

In an exemplary embodiment, the plurality of computing nodes 3100 to 3400 included in the data center 3000 or portions thereof may be present at the same site or at sites physically separated from each other and may communicate with each other over the wireless communication or wired communication based network NT. In an exemplary embodiment, the plurality of computing nodes 3100 to 3400 included in the data center 3000 may be implemented by the same memory technology or may be implemented by different memory technologies.

Although not illustrated in drawing, at least a part of the plurality of computing nodes 3100 to 3400 of the data center 3000 may communicate with an external client node (not illustrated) over the network NT or over any other communication interface (not illustrated). At least a part of the plurality of computing nodes 3100 to 3400 may automatically process a request (e.g., data store or data transfer) depending on a request of the external client node or may process the request at any other computing node.

In an exemplary embodiment, the number of computing nodes 3100 to 3400 included in the data center 3000 is exemplary, and the disclosure is not limited thereto. Also, in each computing node, the number of processors, the number of memories, and the number of storage devices are exemplary, and the disclosure is not limited thereto.

In an exemplary embodiment, each of the plurality of computing nodes 3100 to 3400 may be the host described with reference to FIGS. 1 to 19, and each of the storage devices 3130 to 3430 respectively included in the plurality of computing nodes 3100 to 3400 may be the storage device described with reference to FIGS. 1 to 19. The plurality of computing nodes 3100 to 3400 may respectively control the storage devices 3130 to 3400, based on the KV command described with reference to FIGS. 1 to 19. Each of the storage devices 3130 to 3400 may be configured to manage the internal KV pair as described with reference to FIGS. 1 to 19 and may operate based on the operation method described with reference to FIGS. 1 to 19.

According to an embodiment of the disclosure, a storage device may manage an internal key-value (KV) pair including information about various admin operations. A host may perform various admin operations on the storage device by accessing an internal KV pair through a key-value command provided by a key-value interface. Accordingly, because separate commands for performing various admin operations are not required, an interface between the host and the storage device may be simplified. That is, a storage device with improved performance and reduced costs and an operation method thereof are provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:

1. An operation method of a storage device which includes a nonvolatile memory device, the method comprising:
receiving a first key-value (KV) command including a first key from an external host device;
transmitting a first value corresponding to the first key from the nonvolatile memory device to the external host device as first user data, in response to the first KV command;
receiving a second KV command including a second key, from the external host device; and
performing a first administrative operation based on a second value corresponding to the second key, in response to the second KV command, wherein:
the first KV command and the second KV command are KV commands of a same type, and
the second value includes information about both an administrative command and a command identifier, each of the administrative command and the command identifier corresponding to the first administrative operation.

2. The method of claim 1, wherein:
the first key includes information about a first key group identifier indicating a user key, and a first key name, and
the second key includes information about a second key group identifier indicating an internal key, and a second key name.

3. The method of claim 1, wherein the transmitting of the first value corresponding to the first key from the nonvolatile memory device to the external host device as the first user data, in response to the first KV command, includes:
determining a first location of the first value corresponding to the first key, based on a key index including information about a plurality of keys and locations of values respectively corresponding to the plurality of keys;
reading the first value from the nonvolatile memory device, based on the determined first location; and
transmitting the read first value to the external host device as the first user data.

4. The method of claim 3, wherein the performing of the first administrative operation based on the second value corresponding to the second key, in response to the second KV command, includes:
determining a second location of the second value corresponding to the second key, based on the key index;
reading the second value, based on the determined second location; and
performing the first administrative operation, in response to the read second value.

5. The method of claim 4, further comprising:
writing a first operation log associated with the first KV command in a log buffer;
storing first log data including the first operation log in the nonvolatile memory device; and
allocating a third key to the first log data and updating the key index based on the third key and a third location where the first log data are stored.

6. The method of claim 5, further comprising:
receiving a third KV command including the third key from the external host device; and
transmitting the first log data corresponding to the third key to the external host device, in response to the third KV command, wherein
the first KV command, the second KV command, and the third KV command are KV commands of a same type.

7. The method of claim 1, wherein the second value is included in an internal key-value pair stored in a memory device of the storage device.

8. The method of claim 7, wherein the internal key-value pair is loaded onto the memory device from the nonvolatile memory device, in an initialization process of the storage device.

9. The method of claim 7, further comprising:
receiving a fourth KV command including a fourth key and a fourth value, from the external host device;
storing the fourth value in the internal key-value pair, in response to the fourth KV command;
receiving a fifth KV command including the fourth key from the external host device; and performing a second administrative operation corresponding to the fourth value, in response to the fifth KV command.

10. The method of claim 9, wherein the fourth value includes information about an administrative command corresponding to the second administrative operation and a command identifier.

11. A storage device comprising:
a nonvolatile memory device configured to store a user key-value pair including a first value corresponding to a user key; and
a storage controller configured to control the nonvolatile memory device, wherein:
the storage controller includes:
a memory device configured to store:
an internal key-value pair including a second value corresponding to an internal key, and
a key index including information about the user key, the internal key, and locations of the first and second values; and
a key-value (KV) manager configured to:
determine whether a key included in a first key-value (KV) command from an external host device is the internal key or the user key based on the key index,
in response to the first KV command, transmit the first value to the external host device when the key is the user key, and
perform a first administrative operation corresponding to the second value when the key is the internal key.

12. The storage device of claim 11, wherein the internal key-value pair is loaded onto the memory device from the nonvolatile memory device, in an initialization process of the storage device.

13. The storage device of claim 11, wherein the KV manager is further configured to transmit information about the internal key-value pair to the external host device, in response to a second KV command from the external host device.

14. The storage device of claim 11, wherein:
in response to a second KV command from the external host device, the KV manager is further configured to:
update the first value to a third value of the second KV command, in the user key-value pair, when a second key included in the second KV command is the user key; and
update information corresponding to the second value to the third value of the second KV command, when the second key included in the second KV command is the internal key, and
the second value corresponds to a set feature command, and the information corresponding to the second value is feature information of the storage device.

15. The storage device of claim 11, wherein in response to a second KV command from the external host device, the KV manager is further configured to:
update the first value to a third value of the second KV command, in the user key-value pair, when a second key included in the second KV command is the user key; and
update the second value to the third value of the second KV command, in the internal key-value pair, when the second key included in the second KV command is the internal key.

16. The storage device of claim 15, wherein in response to a third KV command which is provided from the external host device and includes the second key being the internal key, the KV manager is further configured to perform a second administrative operation corresponding to the third value.

17. The storage device of claim 11, wherein the storage controller communicates with the external host device through a PCI-express interface based physical port.

18. An operation method of a storage device which includes a nonvolatile memory device, the method comprising:
receiving a first key-value (KV) command including a first key from an external host device;
determining whether the first key is an internal key or a user key; and
performing a first administrative operation for the storage device when the first key is the internal key, wherein:
the first administrative operation is performed based on a first value corresponding to the first key being the internal key, and
the first value includes information about both an administrative command and a command identifier, each of the administrative command and the command identifier corresponding to the first administrative operation.

* * * * *